United States Patent
Enomoto et al.

(10) Patent No.: US 12,327,060 B2
(45) Date of Patent: Jun. 10, 2025

(54) INFORMATION PROCESSING DEVICE AND INFORMATION PROCESSING METHOD

(71) Applicant: DENSO TEN Limited, Hyogo (JP)

(72) Inventors: Chihiro Enomoto, Kobe (JP); Hideki Kawaguchi, Kobe (JP); Junko Hiwatashi, Kobe (JP); Mitsuyo Tanaka, Kobe (JP)

(73) Assignee: DENSO TEN Limited, Kobe (JP)

( * ) Notice: Subject to any disclaimer, the term of this patent is extended or adjusted under 35 U.S.C. 154(b) by 0 days.

(21) Appl. No.: 18/613,265

(22) Filed: Mar. 22, 2024

(65) Prior Publication Data

US 2025/0013415 A1 Jan. 9, 2025

(30) Foreign Application Priority Data

Jul. 7, 2023 (JP) ................. 2023-112619

(51) Int. Cl.
*G06F 3/14* (2006.01)
*G06F 3/0362* (2013.01)
*G06F 3/044* (2006.01)
*G06F 3/04845* (2022.01)
*G06F 3/16* (2006.01)

(52) U.S. Cl.
CPC .......... *G06F 3/1423* (2013.01); *G06F 3/0362* (2013.01); *G06F 3/044* (2013.01); *G06F 3/04845* (2013.01); *G06F 3/167* (2013.01)

(58) Field of Classification Search
CPC .... G06F 3/0362; G06F 3/044; G06F 3/04845; G06F 3/1423; G06F 3/167
See application file for complete search history.

(56) References Cited

U.S. PATENT DOCUMENTS

| | | | |
|---|---|---|---|
| 9,086,748 B2 * | 7/2015 | Nam | G06F 3/0488 |
| 9,851,821 B2 * | 12/2017 | Nam | G06F 3/0362 |
| 10,712,882 B2 * | 7/2020 | Mizuno | G06F 3/0488 |
| 2015/0116369 A1 * | 4/2015 | Nakazawa | G09G 5/38 |
| | | | 345/676 |
| 2019/0250730 A1 * | 8/2019 | Mizuno | G06F 3/0487 |

FOREIGN PATENT DOCUMENTS

JP 2018-034675 A 3/2018

* cited by examiner

*Primary Examiner* — Michael Pervan
(74) *Attorney, Agent, or Firm* — Oliff PLC

(57) ABSTRACT

An information processing device includes: a first display; an operation unit arranged in parallel with the first display; a second display provided on at least one surface of the operation unit; and a controller configured to move a display content displayed on the second display from the second display to the first display and display the display content on the first display.

13 Claims, 24 Drawing Sheets

INFORMATION PROCESSING DEVICE AND INFORMATION PROCESSING METHOD

CROSS-REFERENCE RELATED APPLICATIONS

This application is based on and claims priority under 35 USC 119 from Japanese Patent Application No. 2023-112619 filed on Jul. 7, 2023, the contents of which are incorporated herein by reference.

TECHNICAL FIELD

The present disclosure relates to an information processing device and an information processing method.

BACKGROUND

An operation device of Japanese Patent Application Laid-Open Publication No. 2018-34675 (hereinafter, referred to as Patent Literature 1) includes a dial knob and a detection unit configured to detect a flick operation on a tip surface of the dial knob, selects one of a plurality of change targets related to vehicle air conditioning based on the detected flick operation, and displays an image illustrating a state of the selected change target on the display unit.

In the device of Patent Literature 1, a display region is limited to a narrow space on a top surface of the dial knob, and thus, it is difficult for a user to recognize a display content.

In particular, when the dial knob is operated, a display is hidden by a hand of the user, and it is difficult to recognize the display content while operating the dial knob.

SUMMARY

One aspect of an embodiment of the present disclosure is that in information processing of controlling a second display provided on at least one surface of an operation unit arranged in parallel with a first display, visibility of a display content is improved by moving the display content displayed on the second display to the first display where a display space is not limited by a size of the operation unit.

An embodiment of the present disclosure is exemplified by an information processing device. The information processing device includes a first display, an operation unit arranged in parallel with the first display, a second display provided on at least one surface of the operation unit, and a controller configured to move a display content displayed on the second display from the second display and display the display content on the first display.

The controller of the present disclosure can improve visibility of a display content in information processing of controlling a second display provided on at least one surface of an operation unit arranged in parallel with a first display.

BRIEF DESCRIPTION OF DRAWINGS

Exemplary embodiments of the present disclosure will be described in detail based on the following figures, wherein.

DESCRIPTION OF EMBODIMENTS

First Embodiment

Hereinafter, an in-vehicle system 100 and an information processing method executed by the in-vehicle system 100 according to an embodiment will be described with reference to the drawings. The in-vehicle system 100 includes, for example, a center information display (CID) disposed in front of a driver seat of a vehicle, and executes processing of an interactive system that performs a display output to a user according to an operation performed by the user on the operation unit.

Configuration

Figure 1:
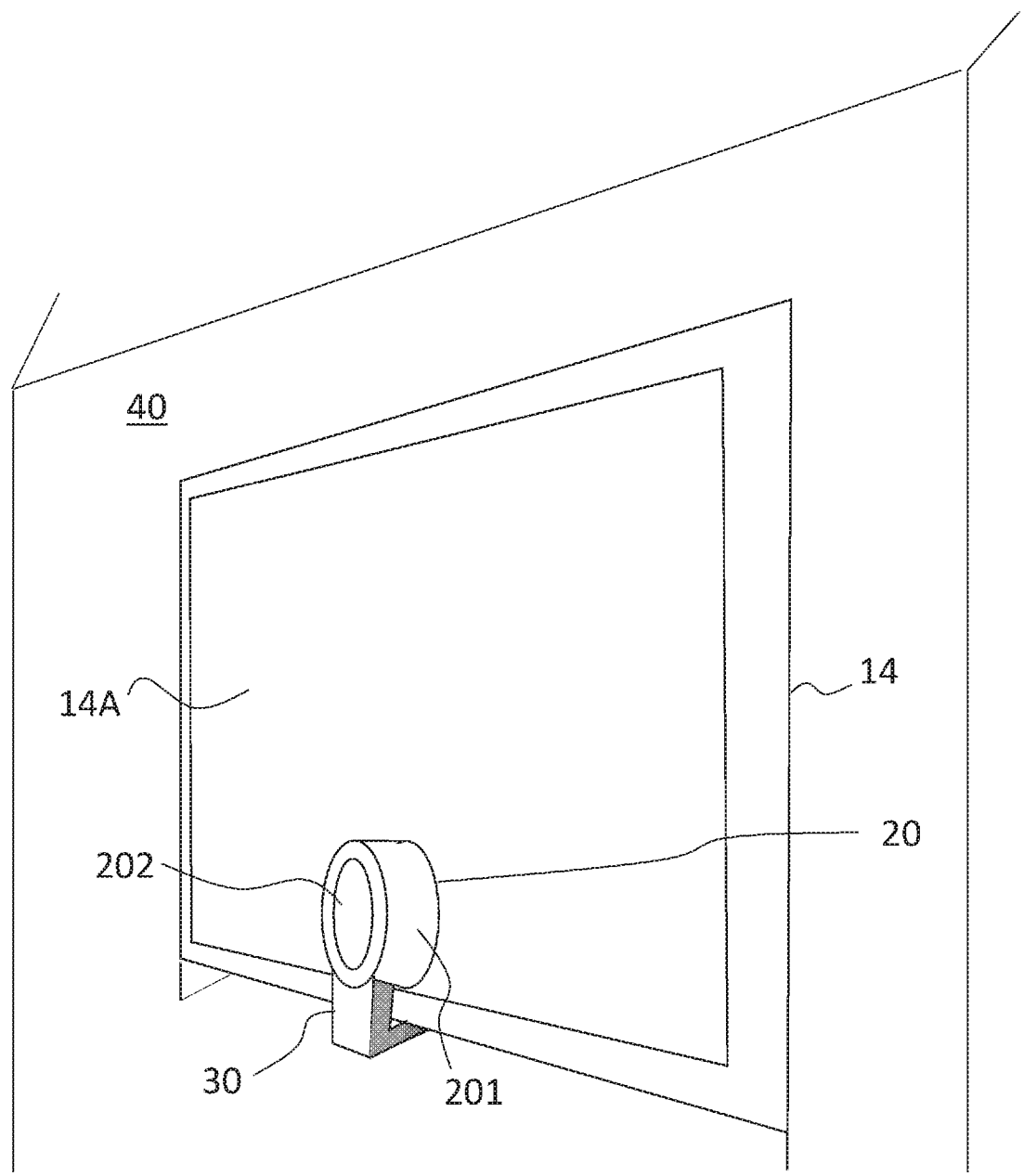
FIG. 1 is an external perspective view illustrating a display device and an operation unit serving as a CID of an in-vehicle system according to a first embodiment.
Figure 2:
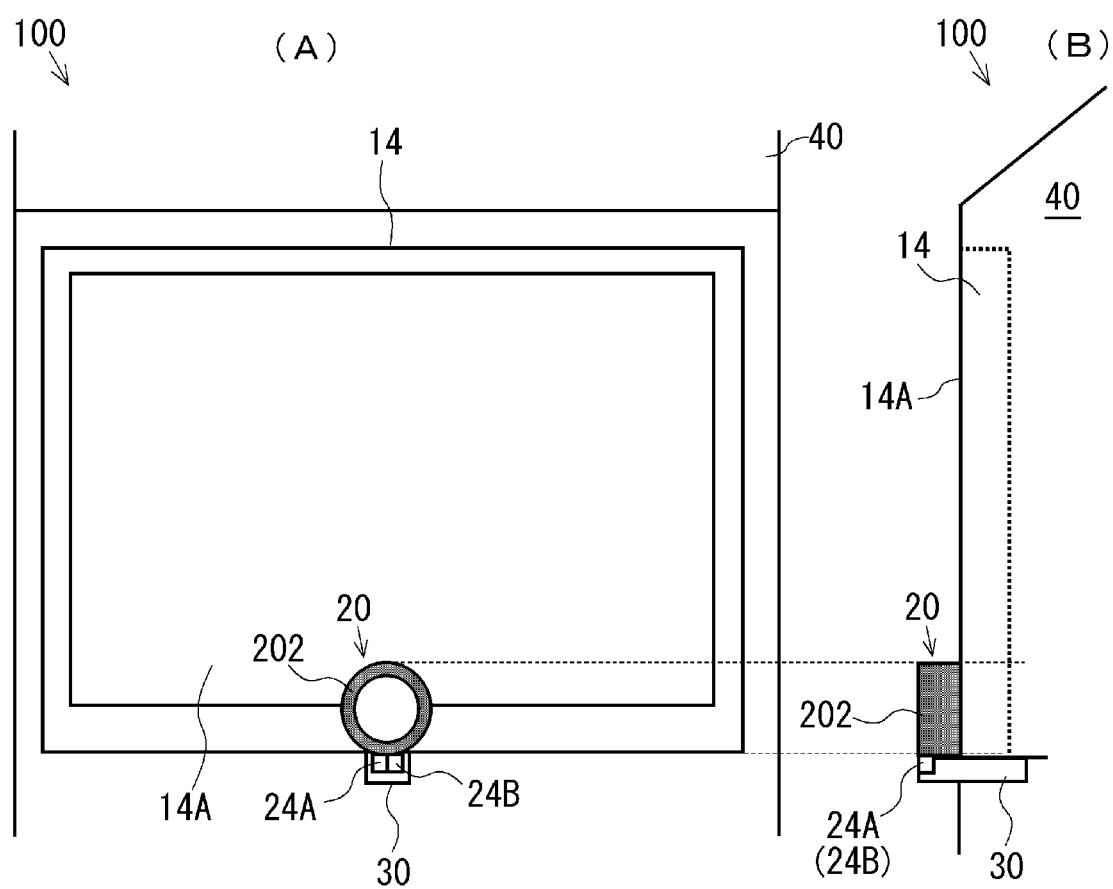
FIG. 2 is a diagram illustrating a schematic configuration of the display device and the operation unit.

FIG. 1 is an external perspective view illustrating a display device 14 and an operation unit 20 that serve as the CID of the in-vehicle system 100, and FIG. 2 is a diagram illustrating schematic configurations of the display device 14 and the operation unit 20, where (A) in FIG. 2 illustrates a front view and (B) in FIG. 2 illustrates a side view. In the example of FIG. 1 and FIG. 2, the display device 14 is embedded in an instrument panel 40 of a vehicle.

The operation unit 20 includes a housing 201 and a support mechanism 30 that supports the housing 201, and is a physical interface that can accept a user's operation. The housing 201 has, for example, a tubular shape, and has two end surfaces perpendicular to a central axis. The housing 201 has openings formed on the two end surfaces, and edges of the openings and a cross section of the housing 201 are ring-shaped. The operation unit 20 may have a cylindrical shape or may have a rectangular tube shape. However, the shape of the operation unit 20 is not limited to the tubular shape, the cylindrical shape, a rectangular tube shape, and the like, and may be various shapes such as a cylindrical shape and a rectangular tube shape with a taper, a slope, and the like, a polyhedral shape, and a shape including a quadratic curved surface. The operation unit 20 is arranged in parallel with the display device 14 on a down side of the display device 14 as a first display. In the example of FIG. 1, the operation unit 20 is disposed at a center in a left-right direction on the down side of the display device 14, an upper part of the operation unit 20 is located above the down side of the display device 14, and a lower part of the operation unit 20 is located below the down side of the display device 14. The present disclosure is not limited to this, and the entire operation unit 20 may be located above the down side of the display device 14 or may be located entirely below the down side of the display device 14. Although the operation unit 20 of the present embodiment is provided adjacent to the display device 14, the present disclosure is not limited thereto, and the operation unit 20 may be provided at a position where the user can view the display device 14 together with the display device 14, and may be provided apart from the display device 14. Here, a back surface of the housing 201 facing the display device 14 is referred to as a facing surface, and a surface opposite to the facing surface is referred to as a display surface 202. Inside the housing 201, a bundle of optical fibers 203 (see FIGS. 3 to 5) is provided in a direction where the opening of the display surface 202 and the opening of the facing surface (back surface) are connected, and a light guide path is formed to project light from a display element 14A of the display device 14 onto the display surface 202. Therefore, in the operation unit 20, the display surface 202 functions as a second display, and a part of the display element 14A facing the facing surface (back surface) that is a surface opposite to the display surface 202 can be projected onto the display surface 202. The operation unit 20 is not limited to a configuration in which light of a display on the display device 14 is guided to the display surface 202, and the operation unit 20 itself may have a function as a display device. Specifically, a display device such as a liquid crystal display or an organic light emitting display (OLED) may be provided in the housing 201, and the display may be wired via the support mechanism 30 or the like.

The operation unit 20 is supported by the support mechanism 30 from a down side in a vertical direction. As described above, since the display device 14 of the present embodiment is embedded in the instrument panel 40 of the vehicle, the left-right direction of the display element 14A is a left-right direction with respect to a traveling direction of the vehicle.

Figure 3:
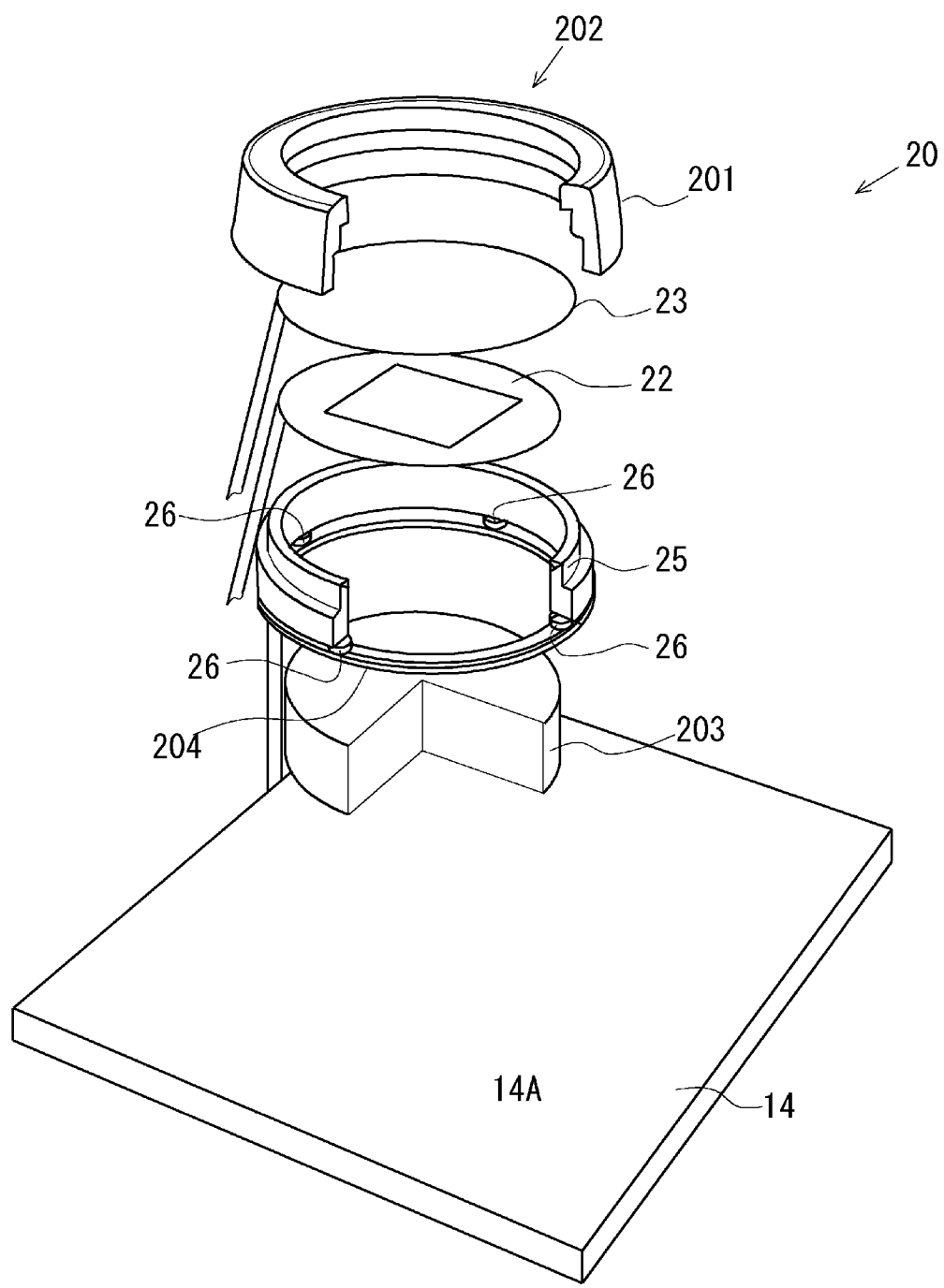
FIG. 3 is an exploded perspective view illustrating a structure of the operation unit.
Figure 6:
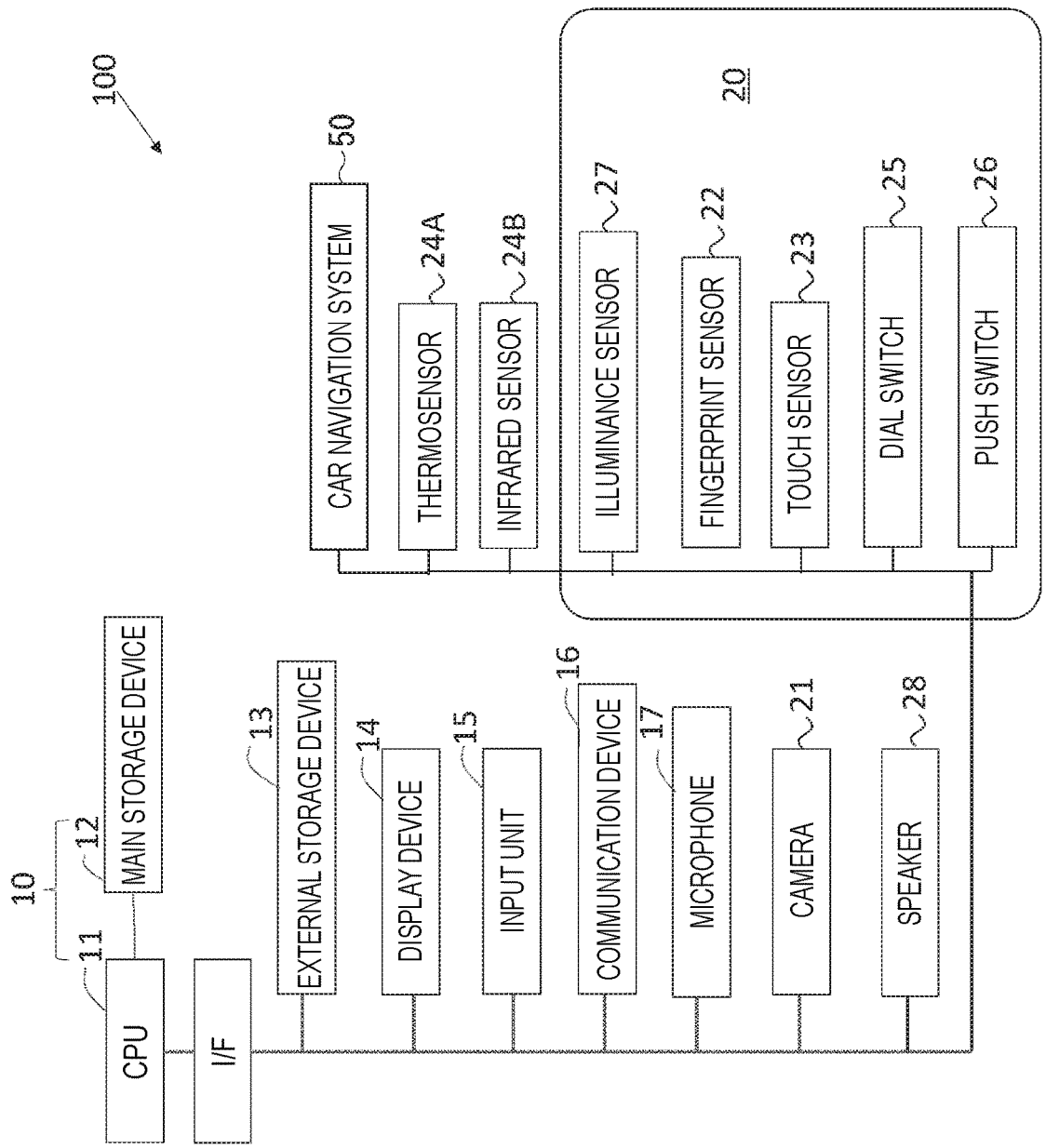
FIG. 6 illustrates a hardware configuration of the in-vehicle system.

FIG. 3 is an exploded perspective view illustrating a structure of the operation unit 20. As described with reference to FIGS. 1 and 2, the operation unit 20 is installed with the back surface thereof facing the display device 14. As illustrated in FIG. 3, the operation unit 20 includes the housing 201, a fingerprint sensor 22, a touch sensor 23, a dial switch 25, push switches 26, and the optical fibers 203. The operation unit 20 displays a processing state and the like of the in-vehicle system 100 on a display surface 202 serving as the second display, and receives input from the user via the fingerprint sensor 22, the touch sensor 23, the dial switch 25, the push switches 26, and the like. In addition to the configuration illustrated in FIG. 3, the operation unit 20 includes a thermosensor 24A, an infrared sensor 24B, and an illuminance sensor 27 (FIG. 6).

The housing 201 has the tubular shape, forms a side surface of the operation unit 20 having a ring-shaped cross section, and has the ring-shaped edges at both ends of the tubular shape. Accordingly, the housing 201 forms an outer shell with ring-shaped openings at both ends. The housing 201 may be decorated, and is also referred to as a decoration portion.

The flat and circular touch sensor 23 is provided on the display surface 202 of the operation unit 20. The touch sensor 23 has a similar configuration to a touch panel provided in a normal mobile device such as a smartphone. For example, the touch sensor 23 includes a first electrode row arranged in parallel in a first direction (referred to as an X-axis direction) on a plane, and a second electrode row arranged in parallel in a second direction (referred to as a Y-axis direction) perpendicular to the first direction. The touch sensor 23 uses two electrode rows to detect an operation of a finger of the user based on a change in capacitance from the finger of the user by using X-axis and Y-axis coordinate values. However, the touch sensor 23 is not limited to a capacitive sensor, and may be a pressure sensitive sensor, for example. Although not illustrated in FIG. 3, a transparent protective film may be provided on an upper surface of the touch sensor 23 (on a display surface 202 side).

The fingerprint sensor 22 is, for example, a capacitive sensor. The fingerprint sensor 22 measures the capacitance based on unevenness of a fingerprint in contact with a front surface (display surface 202) of the operation unit 20 and forms a two-dimensional image, thereby forming a fingerprint image. However, the fingerprint sensor 22 is not limited to a capacitive sensor. For example, the fingerprint sensor 22 may be an array of charge coupled device (CCD) or metal-oxide-semiconductor (MOS) image sensors. When the fingerprint sensor 22 is an array of image sensors, a fingerprint image is generated in the same manner as the camera 21.

When the user rotates the housing 201 clockwise or counterclockwise, the dial switch 25 outputs a physical quantity corresponding to a rotation amount or an electrical signal. The in-vehicle system 100 obtains a value of the physical quantity corresponding to the rotation amount or a value of an electrical signal intensity from the dial switch 25. The dial switch 25 has a tubular shape that is slidably inscribed in a tubular inner surface of the housing 201.

When the user rotates the housing 201 clockwise or counterclockwise, a contact point between the inner surface of the housing 201 and the dial switch 25 changes, and an electrical resistance value, a voltage value, or the like between terminals drawn out from the dial switch 25 changes. The in-vehicle system 100 detects the rotation amount and a rotation direction of the housing 201 from the change in the electrical resistance value, the voltage value, or the like between the terminals of the dial switch 25. For example, when the housing 201 rotates clockwise, the electrical resistance value, the voltage value, or the like increases (or decreases) from initial values. For example, when the housing 201 rotates counterclockwise, the electrical resistance value, the voltage value, or the like decreases (or increases) from the initial values. The in-vehicle system 100 determines that the switch is off if the change in the electrical resistance value, the voltage value, or the like between the terminals output from the dial switch 25 is within a reference value, and determines that the switch is on if the change exceeds the reference value. As described above, the operation unit 20 can accept a rotation operation of the user. That is, the operation unit 20 may be physically rotatable. However, the dial switch 25 may be omitted. If the dial switch 25 is omitted, the housing 201 of the operation unit 20 may not rotate. When the housing 201 of the operation unit 20 does not rotate, the operation unit 20 may detect a rotation operation performed by the hand of the user by the touch sensor 23.

The dial switch 25 is not limited to one that detects a change in the electrical resistance value, the voltage value, or the like between the terminals. For example, a general rotary encoder may be used as the dial switch 25. For example, the dial switch 25 may be one in which a plurality of windows are provided in a tubular side wall in a circumferential direction, and whether light is transmitted is determined between the inside and the outside (inner surface side of the housing 201) of the tubular side wall of the dial switch 25. For example, a light emitting unit such as an LED may be provided on the inner surface side of the housing 201, and a light receiving unit such as a photodiode may be provided inside the tubular side wall of the dial switch 25 to receive light passed through the window from the light emitting unit. By changing and arranging the windows in stages such as large, medium, and small, an amount of light received by the light receiving unit or a light receiving time changes. The rotation direction can also be determined depending on whether a direction of this change is large, medium, or small.

When the push switch 26 is pressed, contact points close, an electrical signal flows between the contact points, and the operation of the user is detected. In the present embodiment, four push switches 26 are provided between the dial switch 25 and a ring 204 provided at a down side of the dial switch 25. The four push switches 26 are arranged at a central position of each of arc regions that divide the ring 204 into four, for example, a fan-shaped arc that divides the circular ring 204 into 90 degrees at the center of the ring 204. Therefore, when the user presses the housing 201 evenly, the four push switches 26 can be turned on from off at the same time. When the user presses a position on the housing 201 corresponding to nearby of the middle of one of the two ring parts divided from the ring 204, the two push switches 26 can be turned on from off. Further, when the user presses positions on the housing 201 corresponding to the four 90 degree fan-shaped parts divided from the ring 204, only one push switch 26 can be turned on from off. The number of push switches 26 is not limited to four, and may be one to three, or five or more. If the number of push switches 26 is less than four, the in-vehicle system 100 can construct a simple user interface. If the number of push switches 26 is five or more, the in-vehicle system 100 can detect a user operation in detail.

The optical fibers 203 are inserted to be a bundle in a tubular space inside the housing 201 and between the opening in the back surface of the operation unit 20 and the opening in the display surface 202. The bundle of the optical fibers 203 projects a part of the display element 14A facing the back surface of the operation unit 20 onto the display surface 202 of the operation unit 20.

Figure 4:
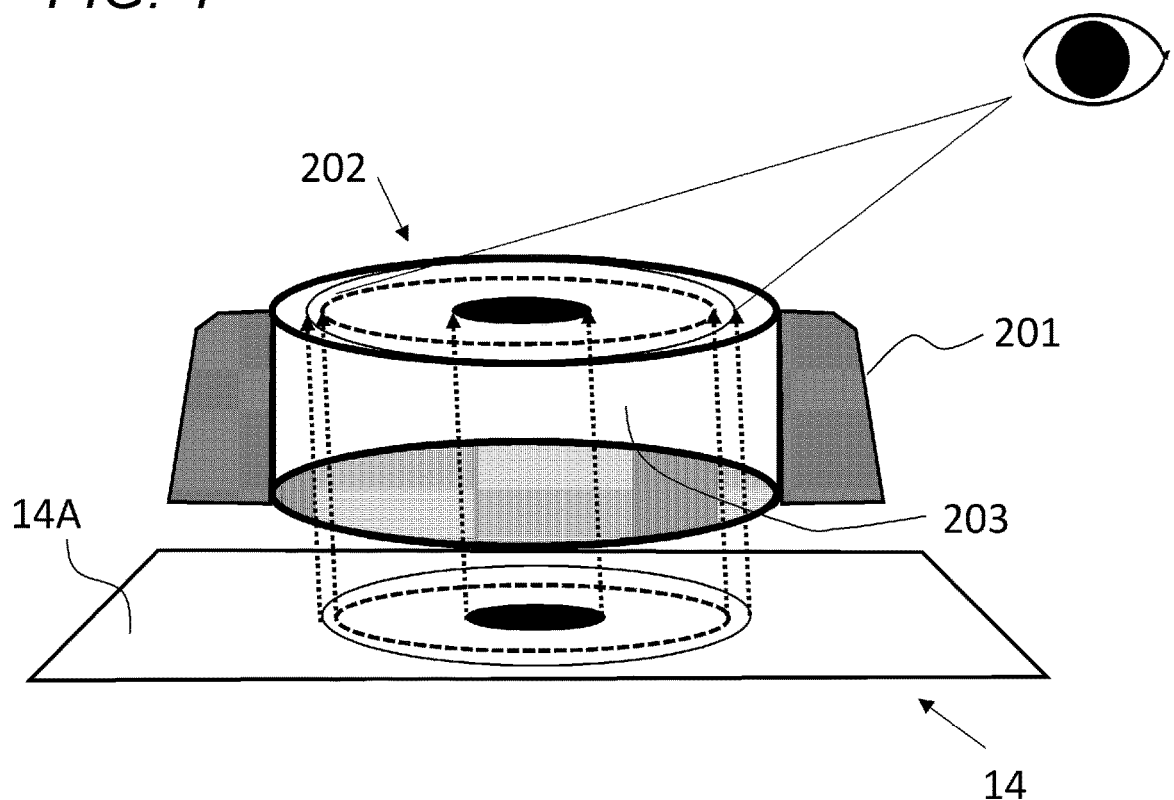
FIG. 4 is a diagram illustrating an effect achieved by a bundle of optical fibers within the operation unit.

FIG. 4 is a diagram illustrating an effect achieved by the bundle of the optical fibers 203 within the operation unit 20. As described in FIG. 3, the part of the display element 14A facing the back surface of the operation unit 20 is projected onto the display surface 202 of the operation unit 20 by the optical fibers 203.

Figure 5:
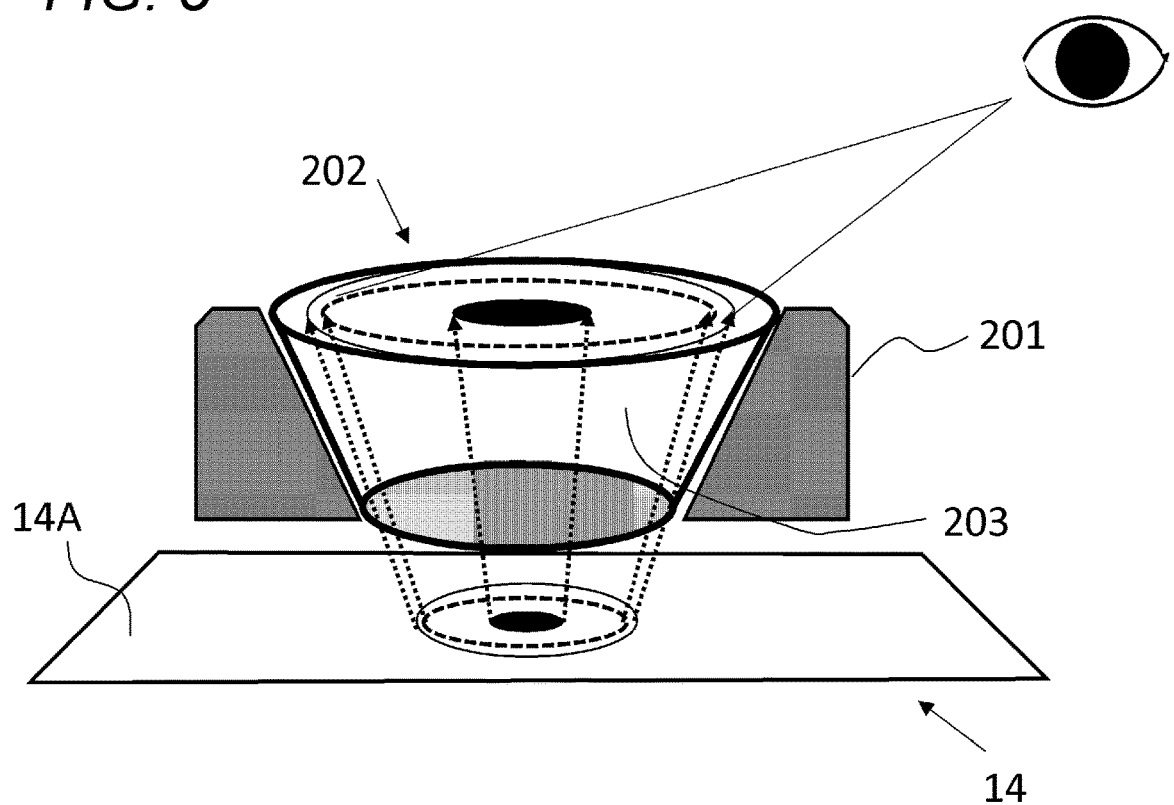
FIG. 5 illustrates an effect achieved by a modification of the operation unit illustrated in FIG. 4.

FIG. 5 illustrates an effect achieved by a modification of the operation unit 20 illustrated in FIG. 4. That is, in FIG. 5, the bundle of the optical fibers 203 gradually expands in a range from the back surface of the operation unit 20 to the display surface 202, and has a tapered shape. That is, in the bundle of the optical fibers 203, gaps between the optical fibers 203 at a part near the back surface of the operation unit 20 are narrow and dense, and gaps between the optical fibers 203 at a part near the display surface 202 of the operation unit 20 are wide. Alternatively, an outer diameter of each of the optical fibers 203 may be thinner at the part near the back surface of the operation unit 20, and the outer diameter of the optical fiber 203 may be thicker at the part near the display surface 202 of the operation unit 20. Due to such a bundle of optical fibers 203, the number of pixels per unit area of an image on the display surface 202 is lower than that of the display element 14A of the display device 14, and fineness (resolution) is lowered, but the entire image is enlarged. That is, the part of the display element 14A facing the back surface of the operation unit 20 is enlarged and projected onto the display surface 202. In this case, even if the display element 14A has a general rectangular shape, the down side of the display surface 202 may be disposed to protrude below the down side of the display device 14.

FIG. 6 illustrates a hardware configuration of the in-vehicle system 100. The in-vehicle system 100 includes a control unit 10 and external devices connected to the control unit 10 through an interface (I/F). The control unit 10 includes a CPU 11 and a main storage device 12. The external devices include an external storage device 13, the display device 14, an input unit 15, a communication device 16, a microphone 17, the camera 21, a speaker 28, the operation unit 20, and a car navigation system 50.

The CPU 11 executes a computer program loaded in an executable manner in the main storage device 12 and provides a function of the in-vehicle system 100. The CPU 11 is also referred to as a processor. However, the CPU 11 is not limited to a single processor, and may implemented by a multiprocessor. The CPU 11 may be a single processor connected through a single socket, and may have a multi-core configuration. Furthermore, at least a part of processing of the in-vehicle system 100 may be provided by a dedicated processor such as a digital signal processor (DSP), a graphics processing unit (GPU), a numerical calculation processor, a vector processor, and an image processing processor, an application specific integrated circuit (ASIC), and the like. At least a part of the in-vehicle system 100 may be a dedicated large scale integration (LSI) such as a fieldprogrammable gate array (FPGA) or other digital circuit. At least a part of the in-vehicle system 100 may include an analog circuit.

The main storage device 12 is also simply referred to as a memory, and stores computer programs executed by the CPU 11, data processed by the CPU 11, and the like. The main storage device 12 is a dynamic random access memory (DRAM), a static random access memory (SRAM), a read only memory (ROM), or the like.

The external storage device 13 is used, for example, as a storage region to supplement the main storage device 12, and stores a computer program executed by the CPU 11, data processed by the CPU 11, and the like. The external storage device 13 is a hard disk drive, a solid state drive (SSD), or the like. Furthermore, the in-vehicle system 100 may be provided with a drive device for a removable storage medium. The removable storage medium is, for example, a Blu-ray disc, a digital versatile disc (DVD), a compact disc (CD), or a flash memory card.

The display device 14 is, for example, a liquid crystal display or an electroluminescent panel. The input unit 15 is, for example, a keyboard or a pointing device. In the present embodiment, a touch panel is exemplified as the pointing device. The communication device 16 exchanges data with other devices on a wireless network. The wireless network is, for example, a mobile phone network. The microphone 17 obtains voice of the user. That is, the microphone 17 functions as a speech detection unit that detects a speech of the user. The number of microphones 17 is not limited to one, and a plurality of microphones may be provided. The microphone 17 may be provided in the operation unit 20.

The camera 21 may be disposed near the operation unit 20 or may be disposed anywhere in a passenger compartment. The camera 21 has, for example, an array of the CCD or MOS image sensors, and transmits an image, which is pixel array data, to the CPU 11. The CPU 11 obtains video from the camera 21 at a predetermined frame rate, for example, at 10 frames/second to 120 frames/second. In the present embodiment, an image including a plurality of series of frames is referred to as the video. An object included in one frame is simply referred to as an image.

The speaker 28 includes, for example, a piezoelectric element (piezo element). The speaker 28 receives an electrical signal, converts the electrical signal into mechanical vibration of the piezoelectric element (piezo element), and generates sound in front of the display device 14. The speaker 28 may be disposed near the operation unit 20. The speaker 28 may be disposed anywhere within the passenger compartment. The car navigation system 50 includes map information, and has a function of determining a position of an own vehicle and displaying the position of the own vehicle on a map, and a function of providing route guidance to a set destination.

The operation unit 20 includes the touch sensor 23, the thermosensor 24A, the infrared sensor 24B, the dial switch 25, the push switches 26, and the illuminance sensor 27. Each part of the operation unit 20 is connected to the CPU 11 via the interface I/F. The touch sensor 23, the dial switch 25, and the push switches 26 are those described in FIG. 3.

The thermosensor 24A is also referred to as a thermal camera. The thermosensor 24A measures a temperature distribution of an object to be captured based on an intensity of infrared rays or far infrared rays in an image using the infrared rays or the far infrared rays. The thermosensor 24A outputs infrared image data using, for example, an array of pixel sensors. The pixel sensor is, for example, an element such as a photodiode or a phototransistor made of a compound semiconductor such as InGaAs, GaAs, AL GaAs, InAs, or GaSb or a stack thereof. However, as a pixel sensor, an array of thermocouples (thermopile) may be used instead of an array of compound semiconductor elements. The thermosensor 24A may include a filter that selects infrared rays in a specific wavelength range from the reflected light from an object. The thermosensor 24A may be disposed at the edge of the operation unit 20 (housing 201). The thermosensor 24A may be separated from the operation unit 20 and disposed near the operation unit 20. The thermosensor 24A may be disposed at an optional location in the passenger compartment and apart from the operation unit 20.

The infrared sensor 24B measures a temperature of the object based on the intensity of the infrared rays from the object. However, the infrared sensor 24B does not measure the temperature distribution of the object like the thermosensor 24A, but measures the temperature based on an amount of infrared rays emitted from a specific position of the object, for example. The infrared sensor 24B includes, for example, a thermopile. However, the infrared sensor 24B may utilize a pyroelectric effect of ferroelectric ceramic. The infrared sensor 24B may use an element such as a photodiode or a phototransistor made of a compound semiconductor similar to the thermosensor 24A. The infrared sensor 24B may be disposed at the edge of the operation unit 20 (housing 201). The infrared sensor 24B may be separated from the operation unit 20 and disposed near the operation unit 20. The infrared sensor 24B may be disposed at an optional location in the passenger compartment and apart from the operation unit 20.

The illuminance sensor 27 measures illuminance near the display surface 202 of the operation unit 20 by using the element such as the photodiode, the phototransistor, and a photoresistor. The illuminance sensor 27 may be disposed at the edge of the operation unit 20 (housing 201).

Display Example

Figure 7:
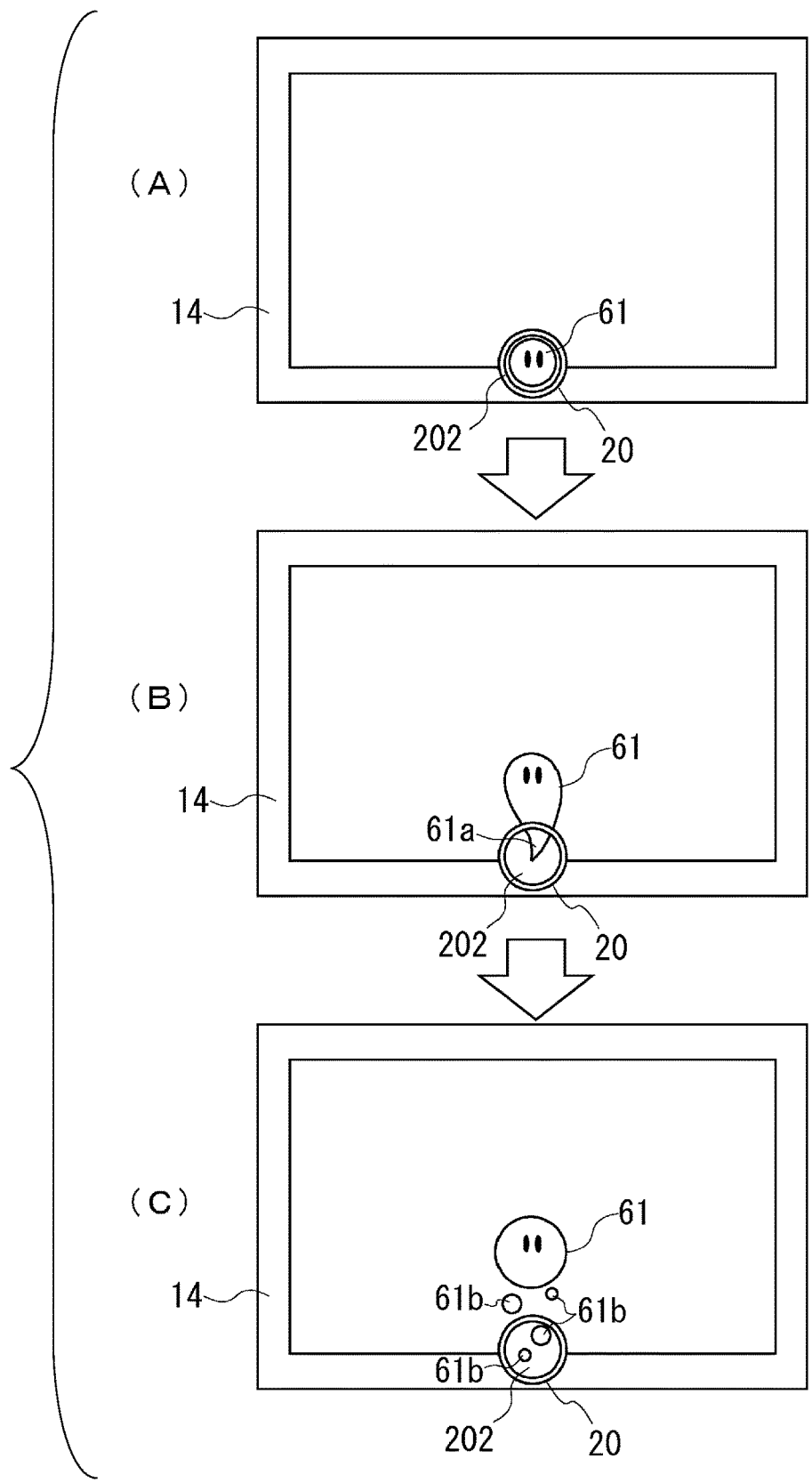
FIG. 7 is an example of a character that personifies a display content provided by the operation unit of the in-vehicle system.

Display contents in the in-vehicle system 100 are illustrated with reference to FIGS. 7 and 8. FIG. 7 is an example of a character 61 that personifies the display content provided by the operation unit 20 of the in-vehicle system 100. Here, the character 61 is a symbolic graphic expression for expressing a state of the operation unit 20. The in-vehicle system 100 uses an operation of the operation unit 20, detection of a specific speech, a touch operation (touch gesture) on the display device 14, and the like as a movement trigger (movement opportunity) to move the character 61 displayed on the display surface 202 of the operation unit 20 to the display device 14, and displays the character 61 on the display device 14.

(A) in FIG. 7 illustrates a state in which the character 61 is displayed on the display surface 202, which is the second display. (B) in FIG. 7 illustrates a process in which the character 61 is moving from the display surface 202 to the display device 14. In (B) in FIG. 7, the character 61 is deformed so as to pull a tail 61a, but the character 61 may be moved without being deformed. (C) in FIG. 7 illustrates a state in which the character 61 is displayed on the display device 14, which is the first display. In (C) in FIG. 7, the tail 61a is illustrated to be broken off and droplets 61b remain on a trajectory of the character, but the droplets 61b do not necessarily have to be displayed. The droplets 61b may be displayed continuously while the character 61 is displayed on the display device 14, or may be erased in order of distances from the character 61 as time passes, for example.

In this way, the in-vehicle system 100 moves the character 61 displayed on the display surface 202 to the display device 14 whose display space is not limited by a size of the operation unit 20, and displays the character 61 on the display device 14, so that the character 61 can be displayed in a large size, and the visibility of the character 61 can be improved. By performing a display in which the character 61 pulls the tail 61a or leaves the droplets 61b when the character 61 moves, the in-vehicle system 100 can more clearly visually indicate that the character 61 is moving.

Figure 8:
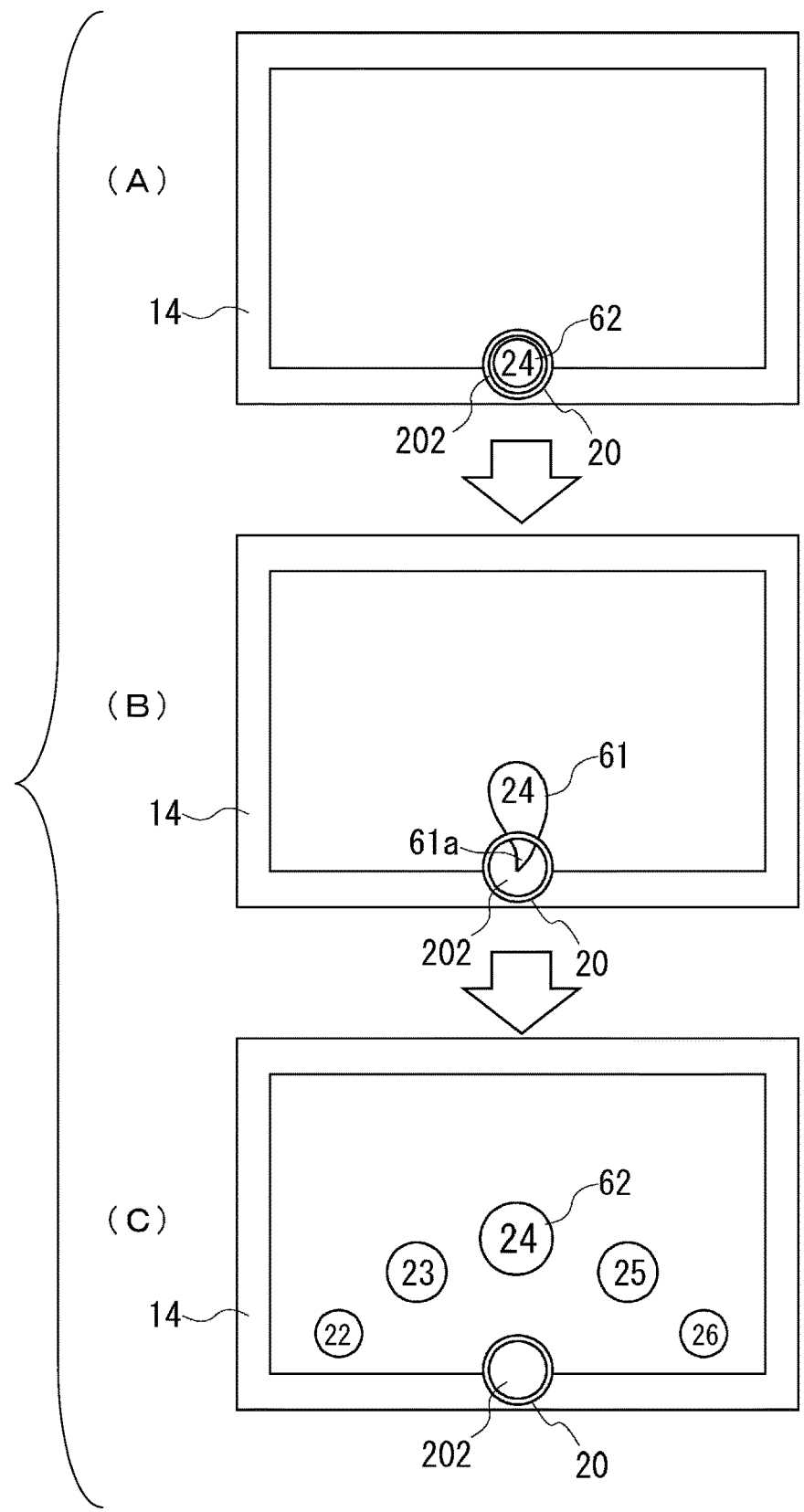
FIG. 8 is an example of the display content provided by the operation unit of the in-vehicle system.

FIG. 8 is an example of a display content 62 provided by the operation unit 20 of the in-vehicle system 100. Here, the display content 62 is a graphic expression showing numerical values, icons, and the like for expressing the state of the operation unit 20. In the example of FIG. 8, the user selects a temperature setting function of an air conditioner for the in-vehicle system 100, and the display content 62 is a set temperature of the air conditioner. The in-vehicle system 100 uses an operation of the operation unit 20, detection of a specific speech, a touch operation on the display device 14, and the like as the movement trigger to move the display content 62 displayed on the display surface 202 of the operation unit 20 to the display device 14, and displays the display content 62 on the display device 14. (A) in FIG. 8 illustrates a state in which the display content 62 is displayed on the display surface 202, which is the second display. (B) in FIG. 8 illustrates a process in which the display content 62 is moving from the display surface 202 to the display device 14. (C) in FIG. 8 illustrates a state in which the display content 62 is displayed on the display device 14, which is the first display. In this way, the in-vehicle system 100 moves the display content 62 displayed on the display surface 202 to the display device 14 whose display space is not limited by the size of the operation unit 20, and displays the display content 62 on the display device 14, so that the display content 62 can be displayed in a large size, and the visibility of the display content 62 can be improved. In the example of FIG. 8 as well, a display effect such as deforming the display content 62 so as to pull the tail as the display content 62 moves or leaving droplets on a moving trajectory of the display content 62 is applied, and it is possible to more clearly visually indicate that the display content 62 is moving. The example in FIG. 8 is a case where the user selects the temperature setting function of the air conditioner for the in-vehicle system 100, the display content 62 is a number representing the set temperature, but the present embodiment can also be applied to functions other than the temperature setting function of the air conditioner, such as an air volume setting function of an air conditioner, a voice volume setting function, and a radio or television channel selection function, and in this case, the display content 62 may be numbers representing an air volume or a voice volume, or numbers representing radio frequency or television channel.

Processing Example

Figure 9:
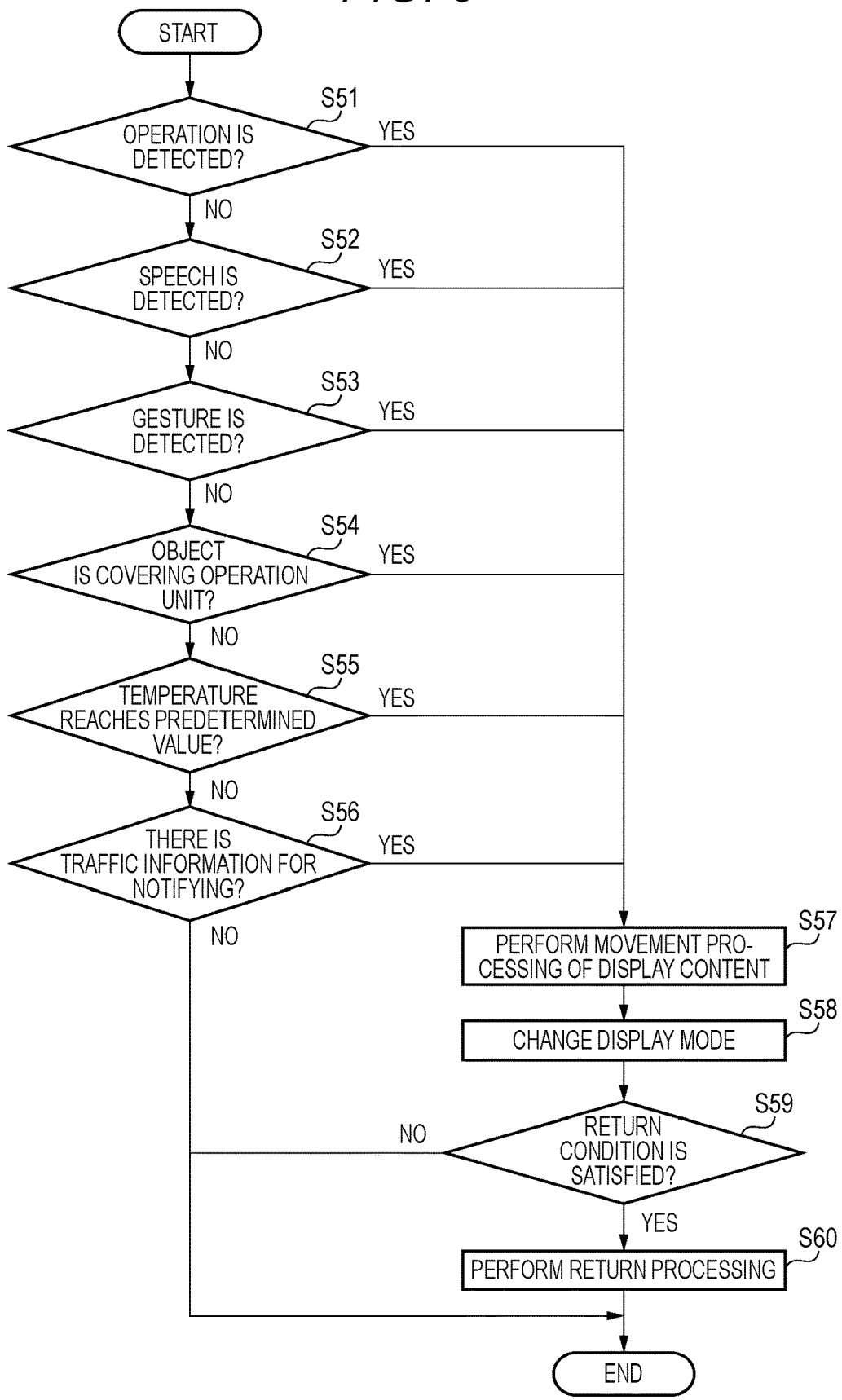
FIG. 9 is a diagram illustrating display control processing in the in-vehicle system.

The control unit 10 of the in-vehicle system 100 executes processing illustrated in FIG. 9 by using a computer program that is loaded in the main storage device 12 in an executable manner.

FIG. 9 is a diagram illustrating display control processing in the in-vehicle system 100. For example, the control unit 10 of the in-vehicle system 100 periodically executes the display control processing in FIG. 9 from the start to the stop of the in-vehicle system 100.

If the display control processing in FIG. 9 is started, the in-vehicle system 100 determines whether the performed by the user on the operation unit 20 is detected (S51). For example, the in-vehicle system 100 determines YES if there is a change in a detection result obtained by the touch sensor 23, the fingerprint sensor 22, the dial switch 25, or the push switches 26, and determines NO if there is no change in the detection result.

If NO is determined in step S51, the in-vehicle system 100 determines whether a specific speech is detected via the microphone (S52). Here, the specific speech is a predetermined phrase, and may be, for example, a speech of the user for the character, such as "Hey! ooo (ooo is the name of the character)". The specific speech may be a phrase indicating an operation such as "lowering the temperature of the air conditioner", "turning up the voice volume", or "turning on the radio".

If NO is determined in step S52, the in-vehicle system 100 detects an action of the user from the image of the camera 21, and determines whether a specific gesture is detected (S53). Here, the specific gesture is a predetermined action, such as "waving a hand", "making a gesture to operate the operation unit", or "pointing at the operation unit 20".

If NO is determined in step S53, the in-vehicle system 100 identifies positions of eyes of the user and the position of the operation unit 20 from the image of the camera 21, and if the operation unit 20 is viewed from the position of the eyes of the user, the in-vehicle system 100 determines whether an object such as the steering wheel or luggage is covering the operation unit 20 (S54).

If NO is determined in step S54, the in-vehicle system 100 determines whether the temperature inside the vehicle reaches a predetermined value for issuing a push notification based on the information from the thermosensor 24A (S55).

If NO is determined in step S55, the in-vehicle system 100 determines whether there is traffic information for issuing the push notification based on information of the car navigation system 50 (S56). If NO is determined in step S56, the in-vehicle system 100 ends the processing in FIG. 9.

Figure 10:
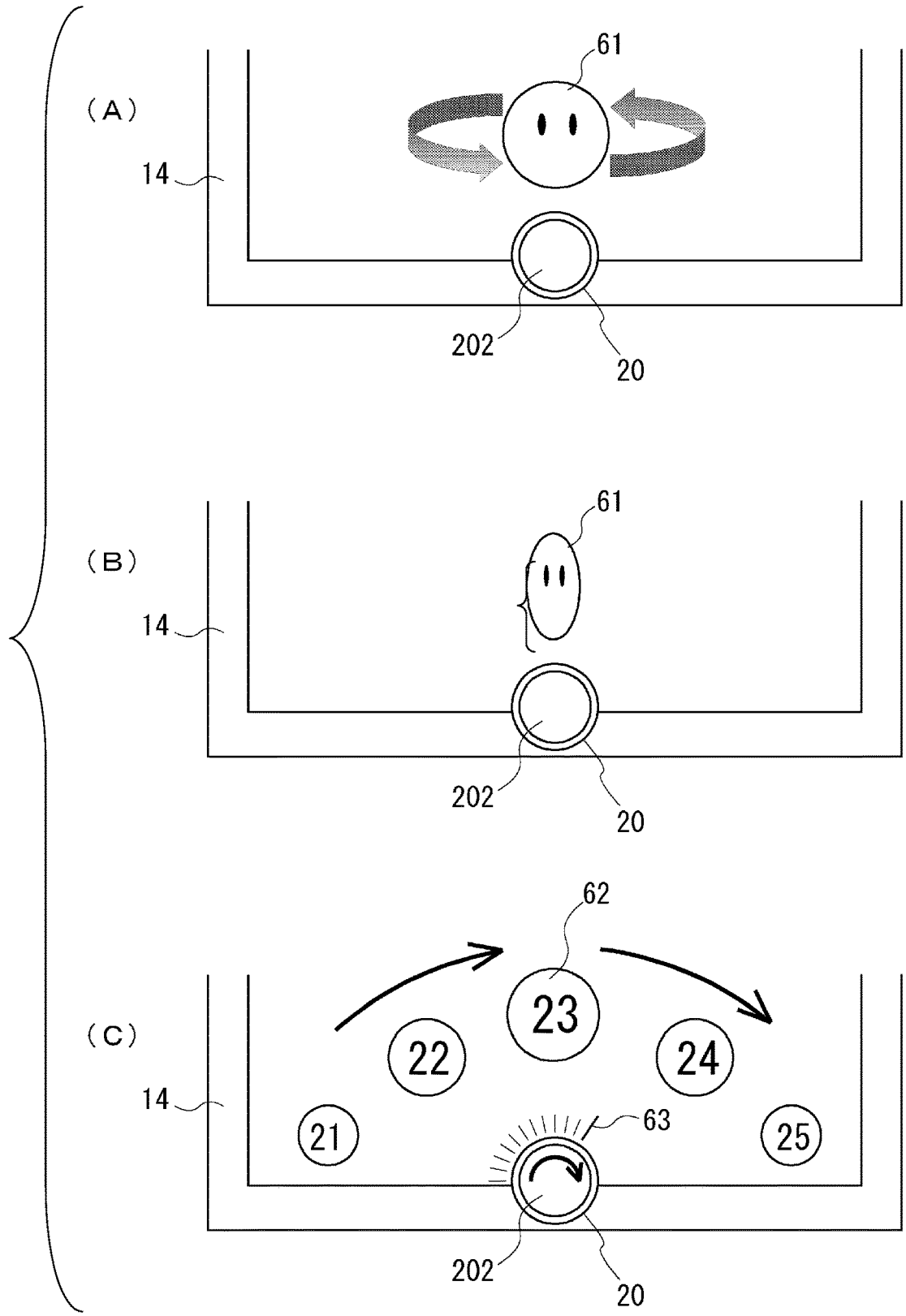
FIG. 10 is a diagram illustrating an example of changing a display mode of the display content.

If YES is determined in steps S51 to S56, that is, if the movement trigger is detected, the in-vehicle system 100 performs movement display processing of the display contents as illustrated in FIGS. 7 and 8 (S57). The in-vehicle system 100 changes a display mode of the display content based on the input information (S58). FIG. 10 is a diagram illustrating an example of changing the display mode of the display content. For example, when the operation unit 20 is rotated by the user, the in-vehicle system 100 rotates the character 61 according to the rotation amount of the operation unit 20, as illustrated in (A) in FIG. 10. When the operation unit 20 is pressed by the user, the in-vehicle system 100 may perform a display in which the character 61 temporarily moves to the back. When the user performs a gripping operation on the operation unit 20, the in-vehicle system 100 may display the character 61 in a manner of narrowing a width thereof, as illustrated in (B) of FIG. 10. By changing the display mode according to the operation in this way, it is possible to provide feedback to the user that the operation is performed, and the user can easily understand the operation.

When the value of the voice volume or the set temperature is changed by the operation of the operation unit 20, luminance or a color of the display content 62 may be changed according to the changed value. For example, when the voice volume is increased, the luminance may be increased according to an increase amount, and when the voice volume is decreased, the luminance may be decreased according to a decrease amount. When the set temperature is set high, the display may be performed in a warm color such as red, and when the set temperature is set low, the display may be performed in a cool color such as blue. As illustrated in (C) in FIG. 10, the in-vehicle system 100 may display the display content similar to that illustrated in (C) in FIG. 8 around the operation unit 20, and may display the display content in a rotation manner in conjunction with a rotational operation of the operation unit 20. In this case, a numerical value that is moved to the center of the display device 14 (directly above the operation unit 20) by rotation may be made effective as the set value. For example, when the display content represents the temperature set value of the air conditioner, "24" representing 24° C. is first displayed in the center of the display device 14, and when "23" representing 23° C. moves to the center of the display device 14 in conjunction with the rotational operation of the operation unit 20, 23° C. becomes effective as the temperature set value of the air conditioner. Instead of rotating the display content, a cursor placed on a display item or a highlighted display may be moved. For example, in a state in which the cursor is first placed on the "24" representing 24° C. in the display content, or "24" is highlighted, when the cursor or the highlighted display moves to "23" representing 23° C. in conjunction with the rotational operation of the operation unit 20, 23° C. may become effective as the temperature set value of the air conditioner. Furthermore, a scale 63 may be displayed, the scale 63 may be rotated together with the operation unit 20, and the rotation amount of the operation unit 20 may be displayed in an easy-to-understand manner by using the scale 63. If movement display control is executed without any operation performed by the user, such as the push notification, changing the display mode in step S58 may be skipped.

After step S58, the in-vehicle system 100 determines whether a return condition of the display content is satisfied (S59), the return condition includes, for example, a case where a gaze of the user leaves the display device 14 or the display surface 202 for a predetermined time or longer, or a case where the operation is not performed on the in-vehicle system 100 for a predetermined time or longer. For example, the in-vehicle system 100 detects the gaze of the user from an image captured by the camera 21, and determines whether the gaze is oriented toward the display device 14 or the display surface 202. That is, the camera 21 also functions as a gaze detection unit. The gaze detection unit is not limited to a camera, but may be a gaze detection sensor.

If YES is determined in step S59, the in-vehicle system 100 uses this determination result as a return trigger to perform processing (return processing) of returning the display content of the display device 14 to the display surface 202 (S60). In this case, the in-vehicle system 100 displays an operation in which the display content moves from the display device 14 to the display surface 202, contrary to FIGS. 7 and 8. In this way, the in-vehicle system 100 of the present embodiment performs display control such that the display content can be exchanged between the display device 14 and the display surface 202.

Effects of Embodiment

As described above, the in-vehicle system 100 of the present embodiment includes the control unit 10 that controls the display device (first display) 14 and the second display (display surface 202) disposed on the outer surface of the operation unit 20 arranged in parallel with the display device 14. The control unit 10 moves the display content displayed on the second display from the second display and displays the display content on the display device 14. Accordingly, the in-vehicle system 100 of the present embodiment can move the display content to the first display whose display space is not limited by the size of the operation unit 20 and display the display content on the first display, so that the visibility of the display content can be improved.

The control unit 10 moves the display content to the display device 14 in response to detecting the operation performed by the user on the operation unit 20. Accordingly, even if the user operates the operation unit 20 and the display content is hidden by the hand of the user, the in-vehicle system 100 of the present embodiment can move the display content to the display device 14 and display the display content on the display device 14, so that the visibility of display content can be improved.

The in-vehicle system 100 of the present embodiment further includes the speech detection unit that detects the speech of the user, and in response to detecting the specific speech of the user, the control unit 10 moves the display content on the second display to the display device 14. Accordingly, the in-vehicle system 100 can move and display the display content with the speech of the user as a trigger.

The control unit 10 changes the display mode of the display content displayed on the second display and moves the display content to the first display. Accordingly, the in-vehicle system 100 can display the display content in an easy-to-visualized manner.

The control unit 10 moves a part of the display content displayed on the second display to the first display. Accordingly, the in-vehicle system 100 can indicate a state in which the display content is moving.

In the in-vehicle system 100 of the present embodiment, the display content may be a character imitating a face. Accordingly, the in-vehicle system 100 can provide a user interface that is friendly to the user.

If the speech of the user for the character is detected, the control unit 10 moves the character 61 to the display device 14. Accordingly, the in-vehicle system 100 can be operated by the speech of the user in a manner of interacting with the character 61, and can provide an easy-to-understand user interface.

Modification

Figure 11:
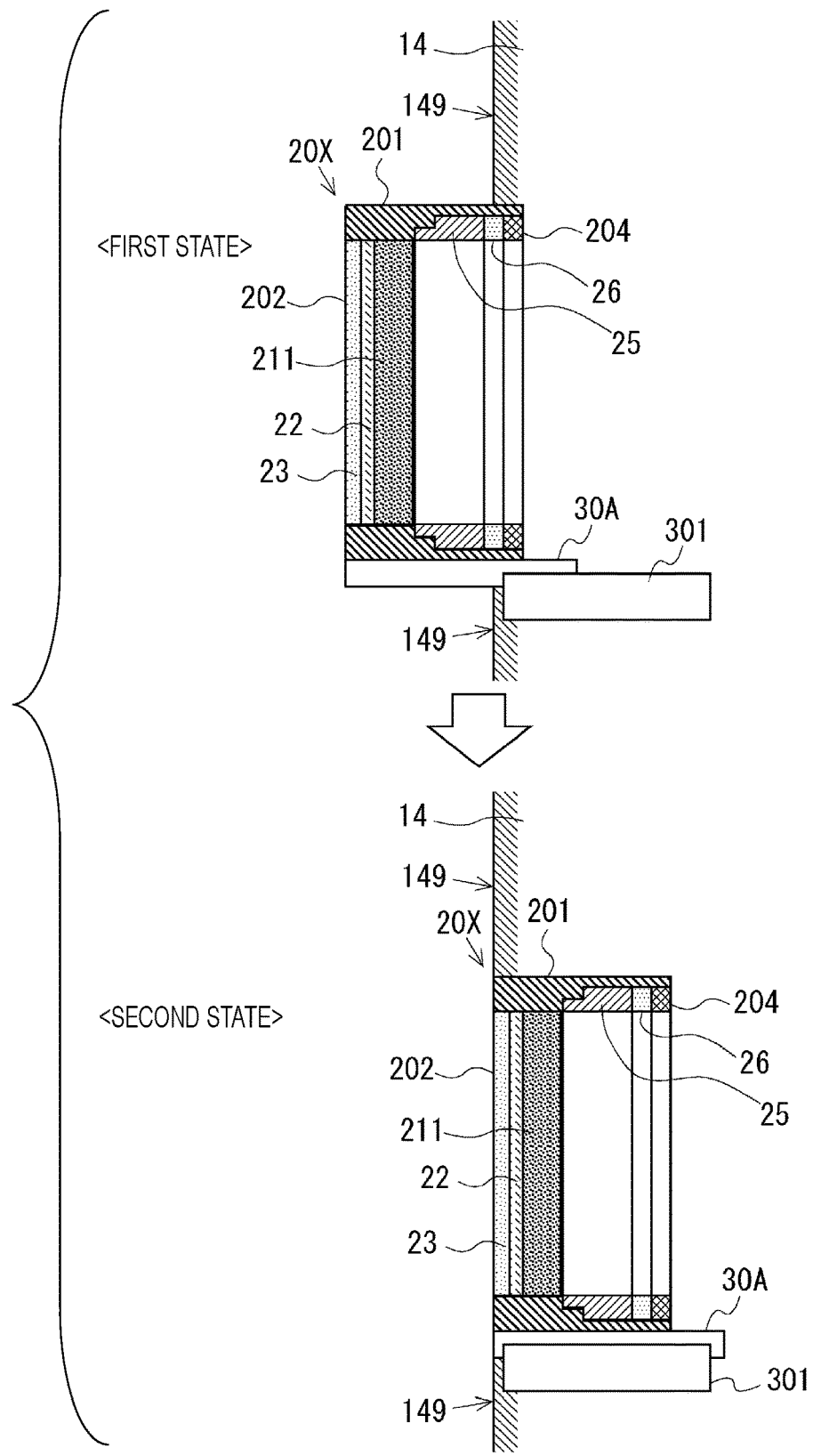
FIG. 11 is a diagram illustrating a modification of the operation unit.

FIG. 11 is a diagram illustrating a modification of an operation unit 20X. The operation unit 20X in FIG. 11 includes a display element 211 on a display surface 202 side, and the control unit 10 displays a display content related to an operation of the operation unit 20X. A support mechanism 30A supports the operation unit 20X so as to be movable forward and backward relative to a display surface 149 of the display device 14. The support mechanism 30A includes an actuator 301, and is displaced between a state (first state) in which the operation unit 20X protrudes from the display surface 149 of the display device 14 and a state (second state) in which the operation unit 20X is housed in the display device 14 according to the control of the control unit 10.

If a part or all of the operation unit 20X is included in an inner region of the display device 14 while the display device 14 is viewed from the front, a notch or a hole may be provided in a part of the display device 14 which interferes with the operation unit 20X, and the operation unit 20X may pass through this notch or hole. When the notch or hole of the display device 14 reaches the display element 14A, the notch or hole can also be provided in the display element 14A itself. In this case, although it is impossible to perform a display in the part corresponding to the notch or hole of the display element 14A, the display element 211 can compensate for a missing display region.

Figure 12:
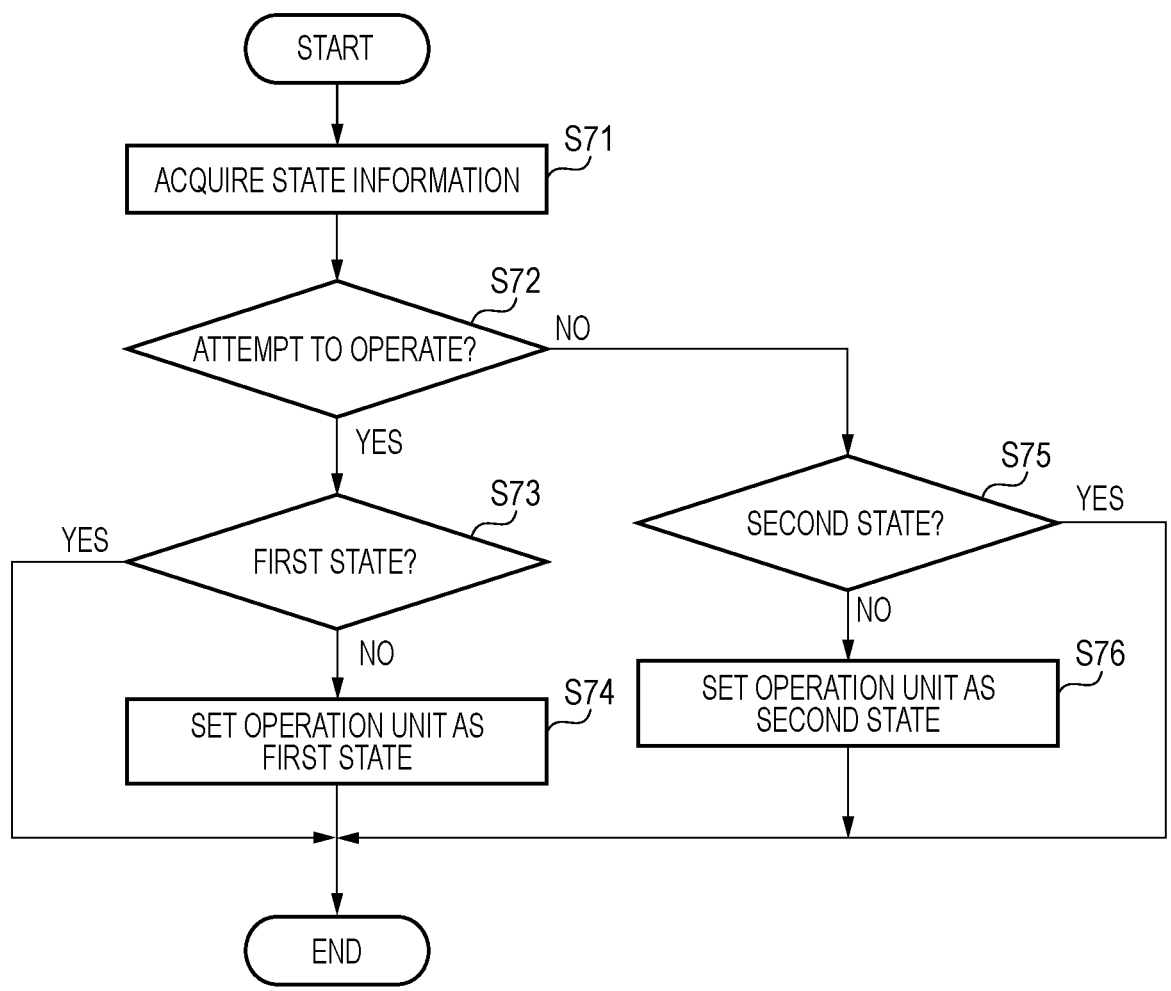
FIG. 12 is a diagram illustrating drive control processing of the operation unit in the in-vehicle system.

FIG. 12 is a diagram illustrating drive control processing of the operation unit 20X in the in-vehicle system 100. For example, the control unit 10 of the in-vehicle system 100 periodically executes the processing illustrated in FIG. 12 in parallel with the display control processing in FIG. 9 from the start to the stop of the in-vehicle system 100.

When the drive control processing in FIG. 12 is started, the in-vehicle system 100 obtains information (state information) indicating a state of the user from the camera 21 and a proximity sensor 29 (S71). For example, the in-vehicle system 100 detects the gaze of the user and a posture of the user based on the image of the camera 21. The in-vehicle system 100 uses the proximity sensor 29 to detect that the hand of the user approaches the operation unit 20X.

The in-vehicle system 100 determines whether the user attempts to operate the operation unit 20X based on the state information of the user which is obtained in step S71 (S72).

In step S72, if the user attempts to operate the operation unit 20X (YES in S72), the in-vehicle system 100 determines whether the operation unit 20X is in the first state (S73). Here, if the operation unit 20X is in the first state (YES in S73), the control unit 10 ends the processing in FIG. 12, and if the operation unit 20X is not in the first state (NO in S73), the control unit 10 controls the support mechanism 30A to advance the operation unit 20X to enter into the first state, and moves the display content displayed on the second display (display surface 202) to the first display (display device 14) (S74). An amount (protrusion amount) by which a tip of the operation unit 20X protrudes from the display surface of the display device 14 when the operation unit 20X is in the first state may be set in advance to a desired protrusion amount depending on a thickness of a finger, a length of a nail, and the like of the hand of the user.

On the other hand, if the user does not attempt to operate the operation unit 20X in step S72 (NO in S72), the in-vehicle system 100 determines whether the operation unit 20X is in the second state (S75). Here, if the operation unit 20X is in the second state (YES in S75), the control unit 10 ends the processing in FIG. 12, and if the operation unit 20X is not in the second state (NO in S75), the control unit 10 controls the support mechanism 30A to retract the operation unit 20X to enter into the second state, and moves the display content displayed on the first display (display device 14) to the second display (display surface 202) (S76).

In this way, according to the present modification, if the user does not perform an operation, the operation unit 20X is set in a housed state (second state), and only if the user attempts to perform an operation, the operation unit 20X can enter into a protrusion state (first state), so that a smart system can be provided. Then, if the user attempts to perform an operation, the display content displayed on the second display (display surface 202) is moved to the first display (display device 14), and thus, even if the display content on the second display is hidden by the hand of the user, the visibility of the display content can be improved.

Second Embodiment

In the first embodiment described above, the movement display processing on the display content is performed with the operation of the operation unit as the movement trigger, but in the present embodiment, a configuration is different from the first embodiment in that the movement display processing on the display content is performed when the hand of the user approaches the operation unit 20. Other configurations are the same as those in the first embodiment, and thus, the same elements are denoted by the same reference numerals and will not be described again.

Figure 13:
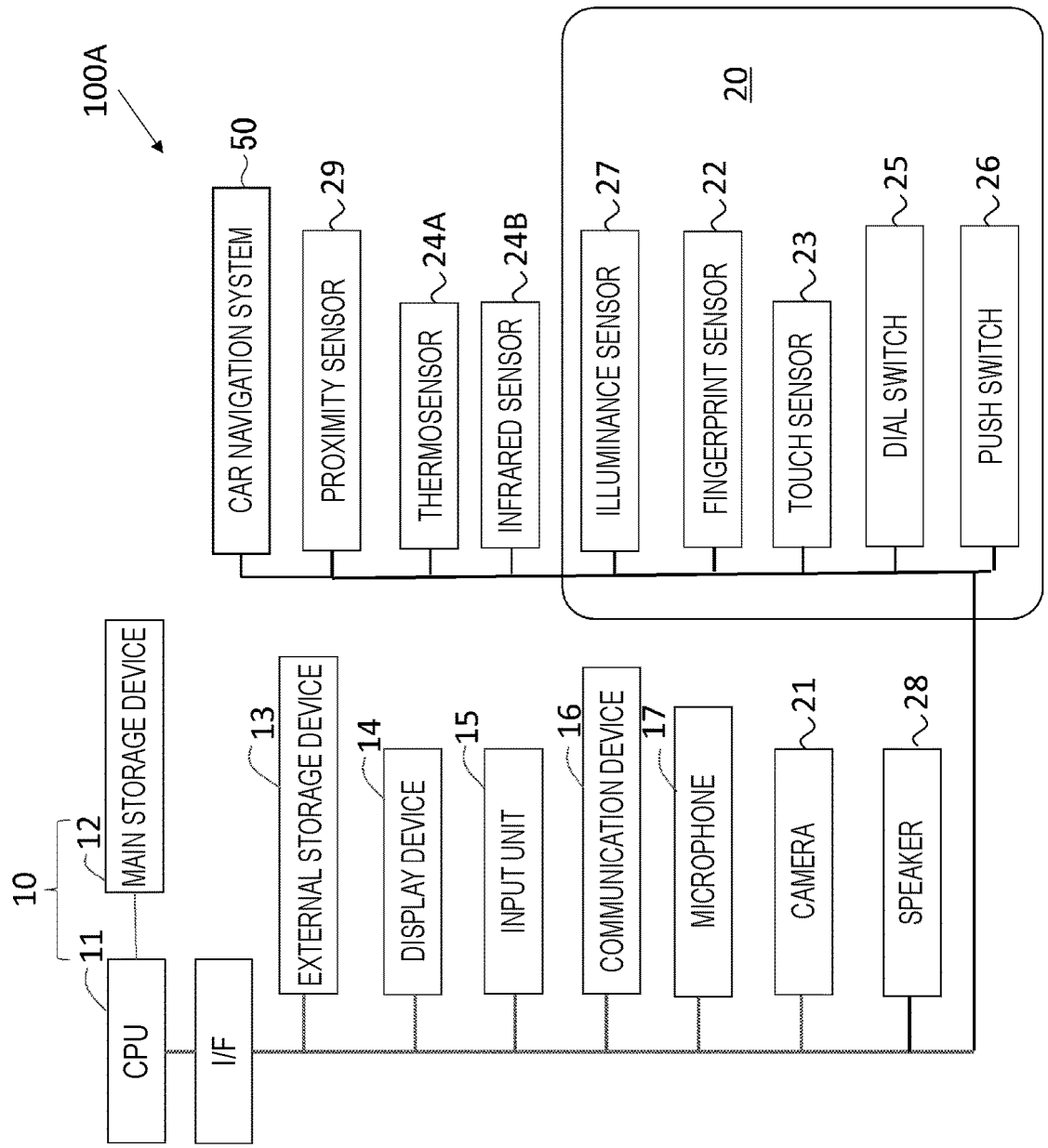
FIG. 13 is a diagram illustrating a hardware configuration of an in-vehicle system according to a second embodiment.

FIG. 13 is a diagram illustrating a hardware configuration of an in-vehicle system 100A according to a second embodiment. In addition to the configuration of the first embodiment, the in-vehicle system 100A further includes the proximity sensor (approach detection unit) 29 that detects the approach of the hand of the user to the operation unit 20. The proximity sensor 29 calculates a distance to the object by calculating a relationship between a speed of sound and a time required from transmitting an ultrasonic signal to a region to be detected until receiving a signal reflected by the object. When the hand of the user approaches the operation unit 20 and the proximity sensor 29 detects that the distance from the hand (object) to the operation unit is less than a predetermined value, the control unit 10 performs the movement display processing on the display content.

Figure 14:
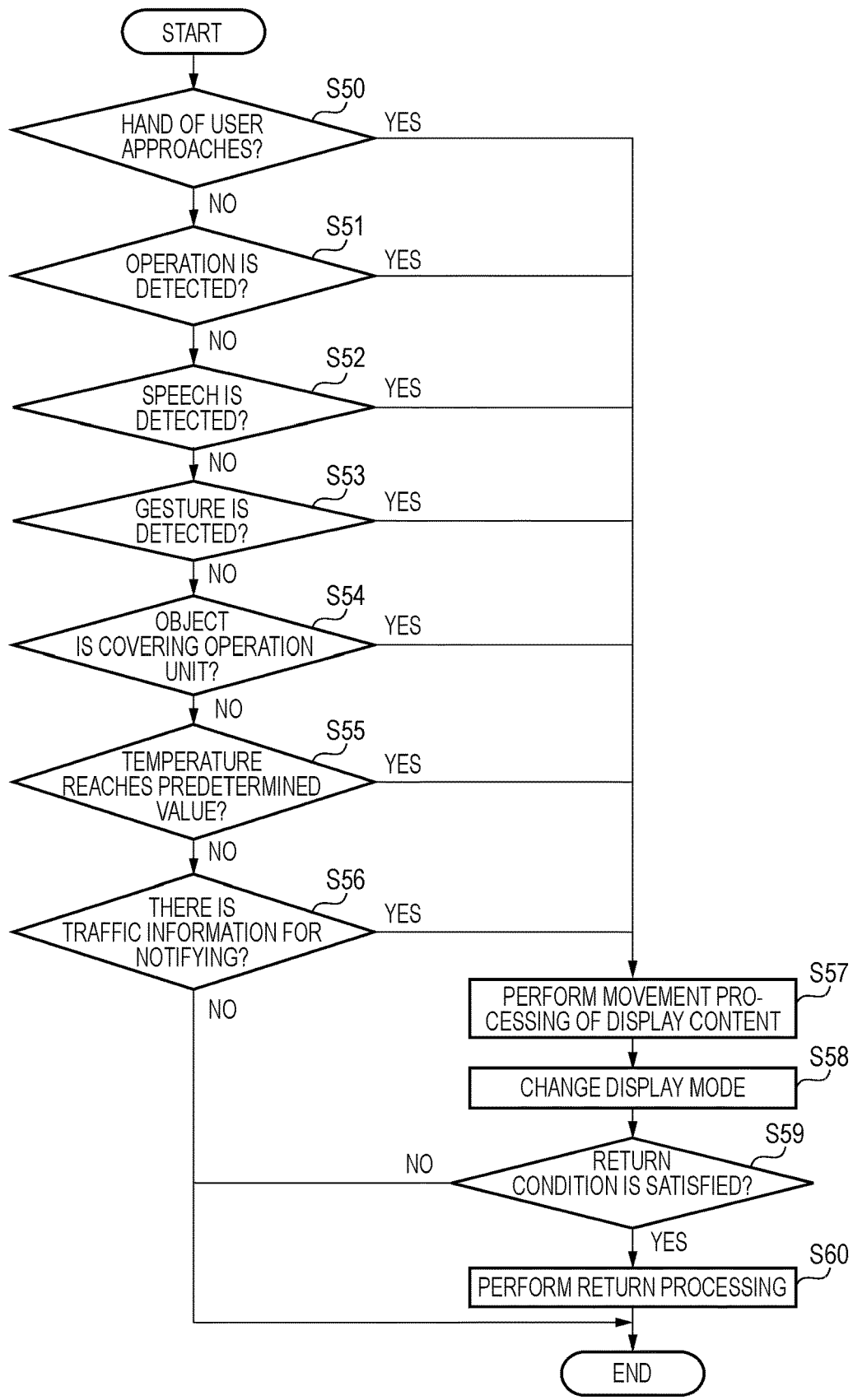
FIG. 14 is a diagram illustrating display control processing in the in-vehicle system according to the second embodiment.

FIG. 14 is a diagram illustrating display control processing in the in-vehicle system 100A according to the second embodiment. If the display control processing in FIG. 14 is started, the in-vehicle system 100A determines whether the hand of the user approaches the operation unit 20 (S50). If YES is determined in step S50, the in-vehicle system 100A performs the movement display processing (S57). Other processing is the same as that in the first embodiment described above.

The in-vehicle system 100A of the present embodiment further includes the approach detection unit that detects the approach of the hand of the user to the operation unit 20, and moves the display content if the approach of the hand of the user is detected. Accordingly, the in-vehicle system 100A executes the display control processing on the display content simply by the user bringing his or her hand close to the operation unit 20, and thus, the visibility of the display content can be easily improved.

Third Embodiment

The present embodiment is different from the second embodiment described above in that the touch operation on the display device 14 is detected and the display content is moved to a position where the touch operation is performed. Other configurations are the same as those in the second embodiment, and thus, the same elements are denoted by the same reference numerals and will not be described again.

Figure 15:
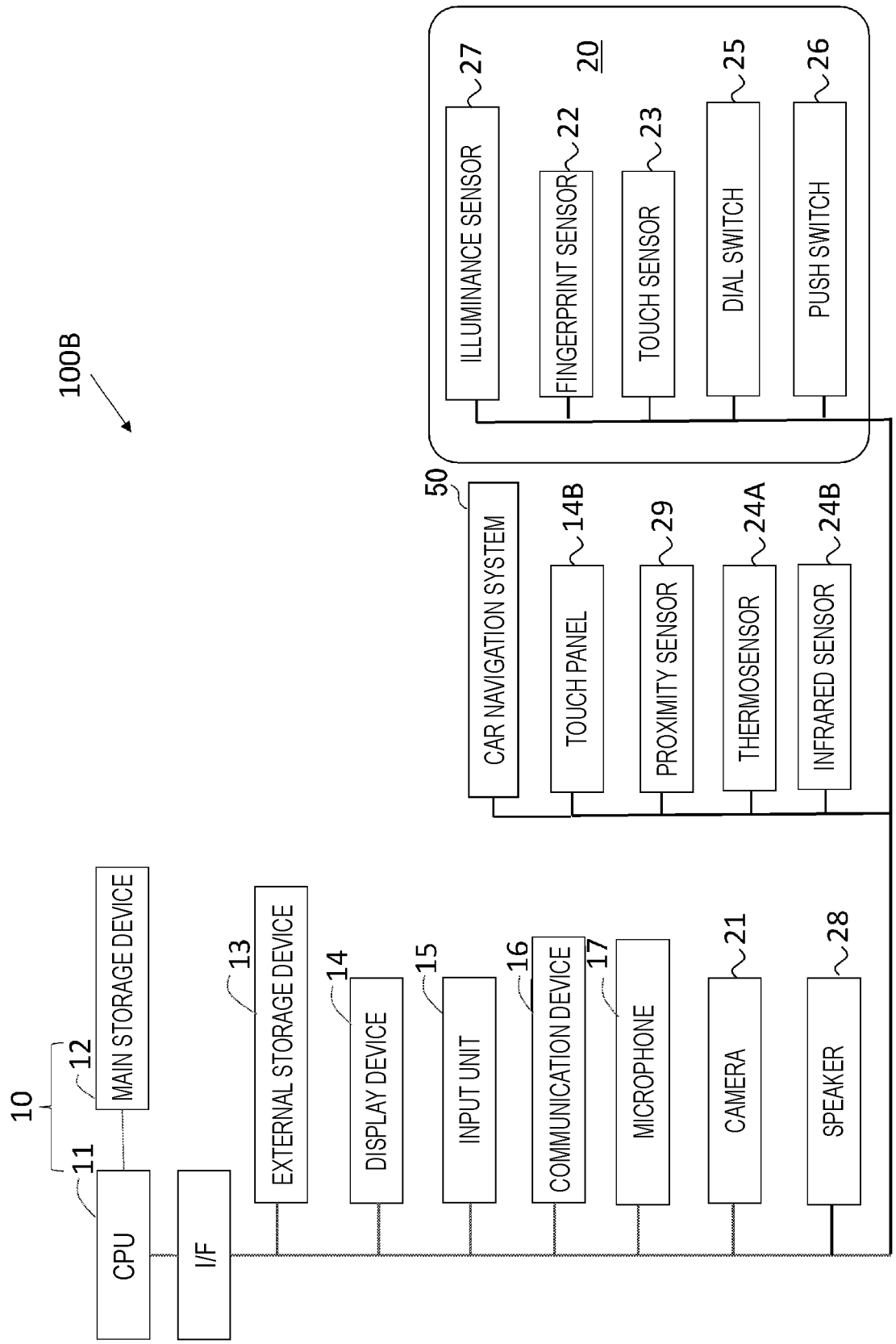
FIG. 15 is a diagram illustrating a hardware configuration of an in-vehicle system according to a third embodiment.

FIG. 15 is a diagram illustrating a hardware configuration of an in-vehicle system 100B according to a third embodiment. In addition to the configuration of the second embodiment, the in-vehicle system 100B further includes a touch panel 14B that detects the touch operation on the display device 14. The touch panel 14B is a transparent panel, and is provided to overlap a display surface side (user side) of the display element 14A. When the user comes into contact with the touch panel 14B (touch operation), the touch panel 14B inputs this contact position to the control unit 10. The touch operation (touch gesture) may be a predetermined number of times of contacts, a contact for a predetermined time, an operation of moving a plurality of contact locations along a predetermined trajectory, or the like such as a single tap, a double tap, a long press, a flick, pinching in, and pinching out.

Figure 16:
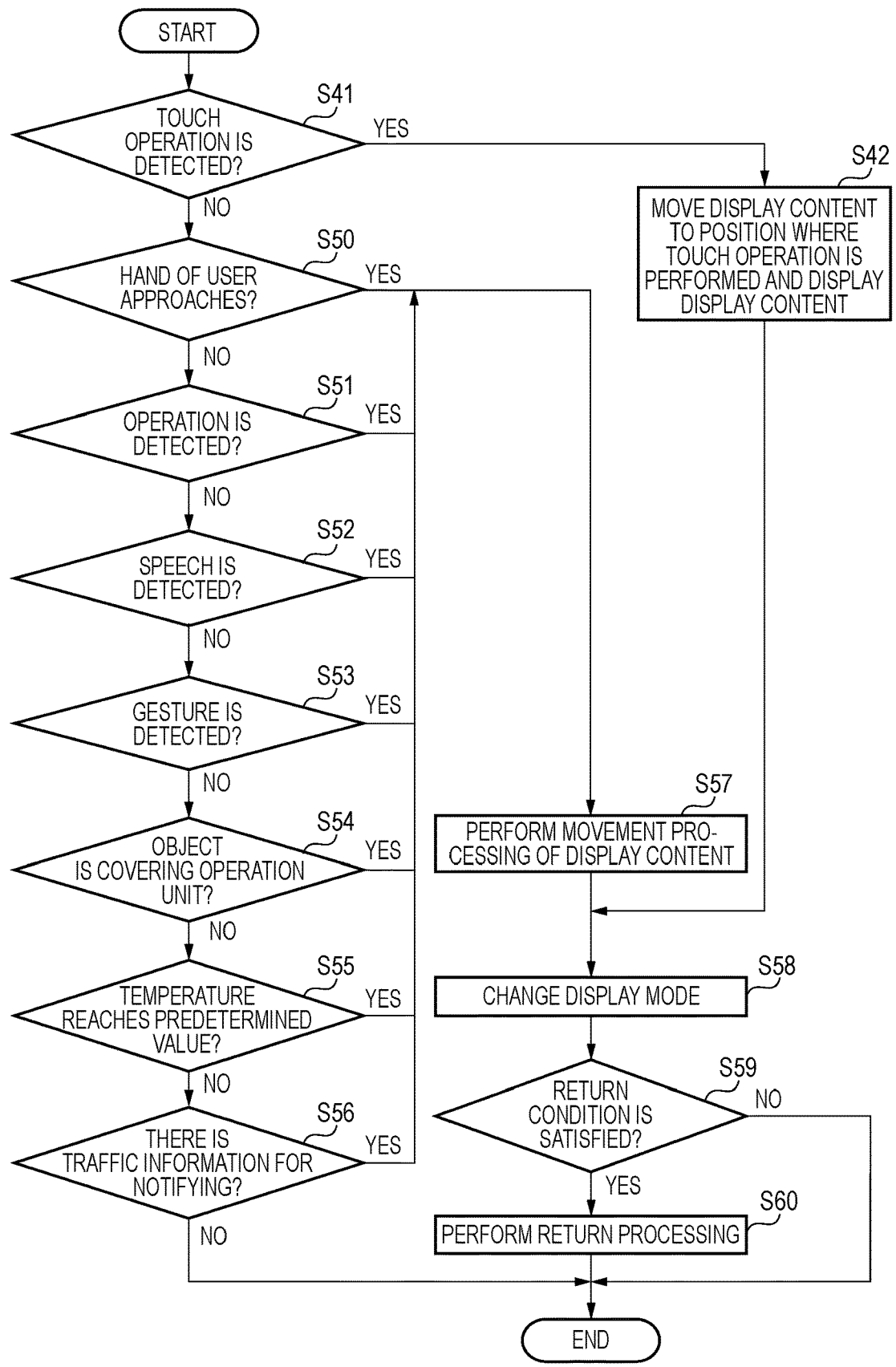
FIG. 16 is a diagram illustrating display control processing in the in-vehicle system according to the third embodiment.

FIG. 16 is a diagram illustrating display control processing in the in-vehicle system 100B according to the third embodiment. If the display control processing in FIG. 16 is started, the in-vehicle system 100B determines whether the touch operation on the display device 14 is detected (S41). If the in-vehicle system 100B determines NO in step S41, the processing proceeds to step S50, and if YES is determined in step S41, the in-vehicle system 100B moves the display content to the position where the touch operation is performed, and displays the display content on the position (S42). After step S42, the in-vehicle system 100B moves to step S58 and changes the display mode. Other processing is the same as that in the second embodiment described above.

Figure 17:
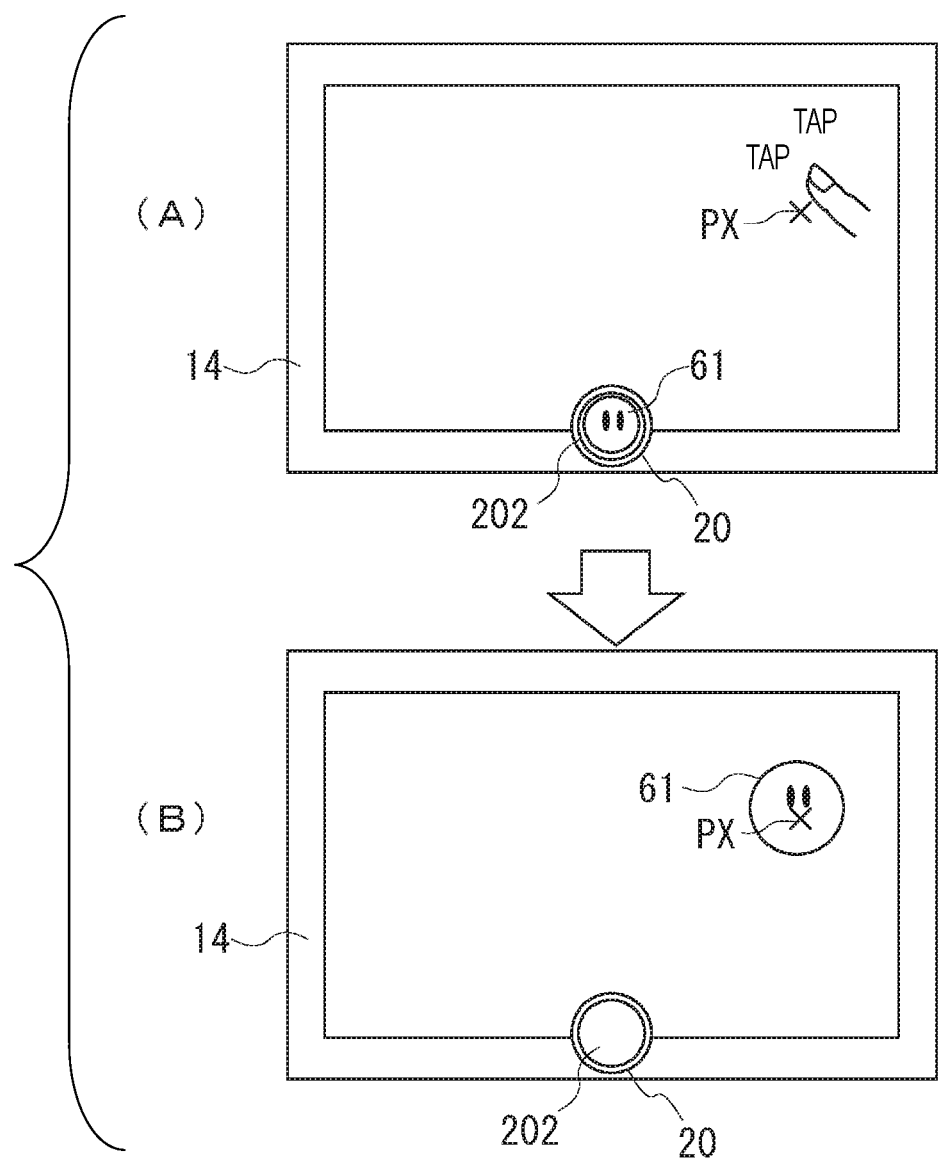
FIG. 17 is a diagram illustrating an example of processing of moving a display content to a position where a touch operation is performed.

FIG. 17 is a diagram illustrating an example of processing of moving the display content to the position where the touch operation is performed. In (A) in FIG. 17, the touch operation is performed at a position PX on the display device 14. In this case, the control unit 10 moves the character 61 displayed on the display surface 202 to the position PX on the display device 14 and displays the character 61, as illustrated in (B) in FIG. 17.

Figure 18:
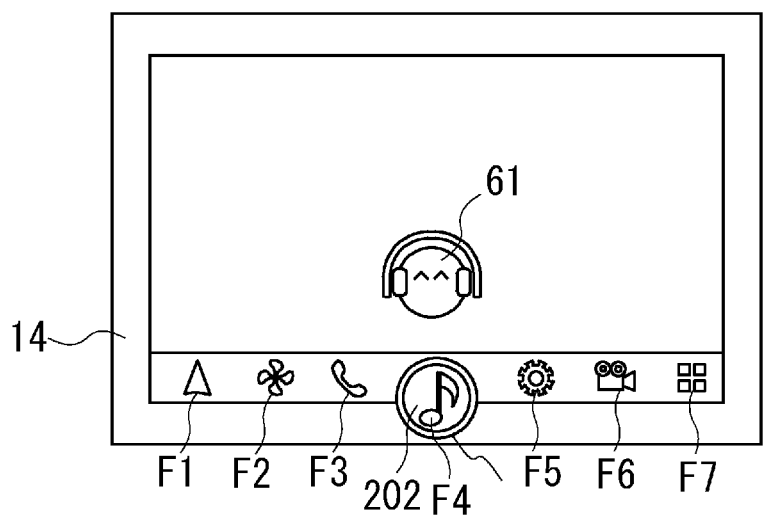
FIG. 18 is a diagram illustrating an example of a function selection menu.
Figure 19:
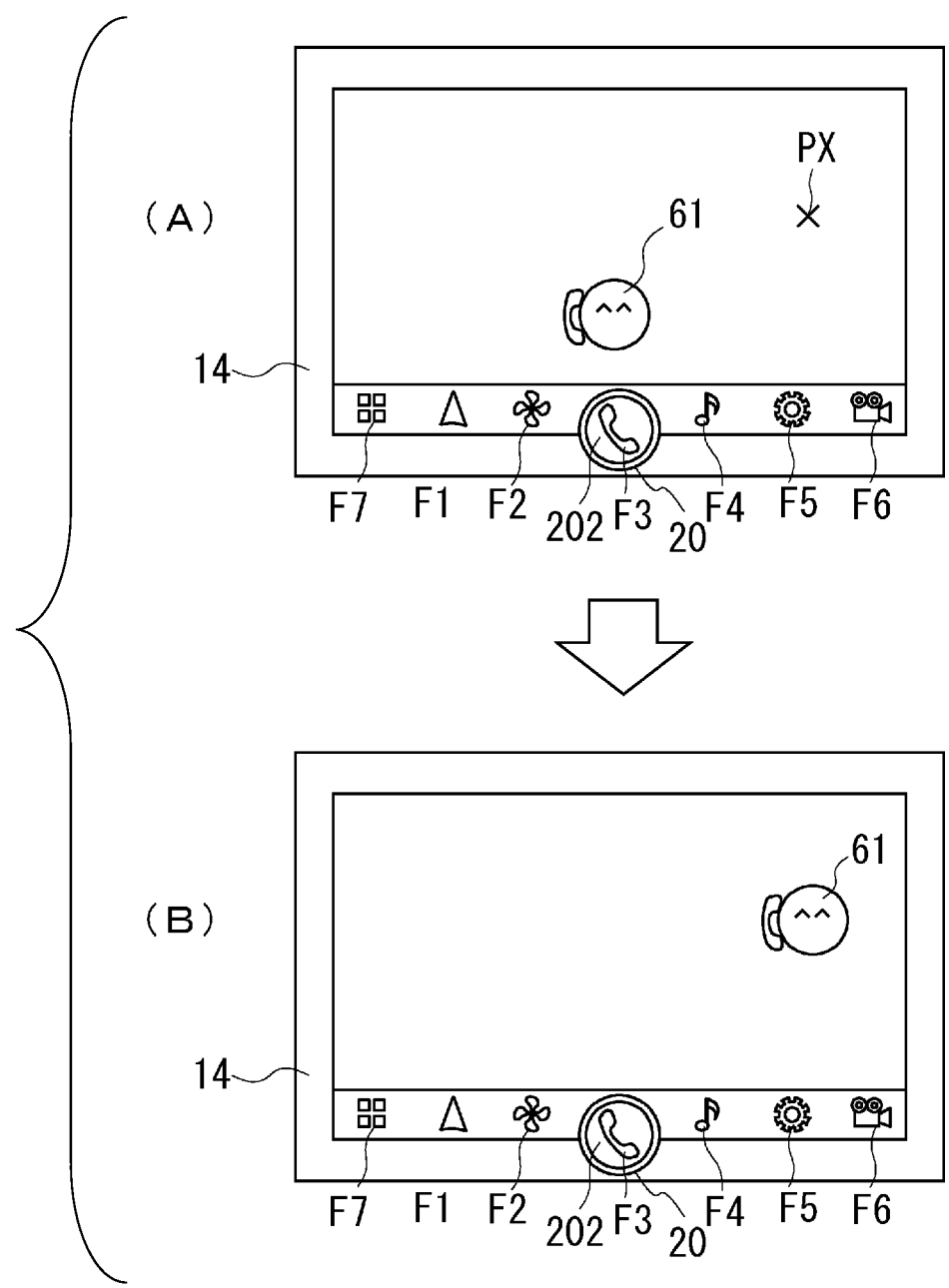
FIG. 19 is a diagram illustrating a state in which a function icon in FIG. 18 is moved.

FIG. 18 is a diagram illustrating an example of a function selection menu, and FIG. 19 is a diagram illustrating a state in which function icons in FIG. 18 are moved. When the user performs an operation to display a selection menu on the in-vehicle system 100B, the control unit 10 displays the selection menu on the display device 14 and the display surface 202 as illustrated in FIG. 18. In this case, the control unit 10 moves the character 61 displayed on the display surface 202 to the display device 14 and displays the character 61 on the display device 14. In this selection menu, a plurality of function icons (menu icons) displayed on the display device 14 and at least one function icon displayed on the display surface 202 are lined up in a row in a predetermined movement direction. In the present embodiment, function icons F1 to F7 are arranged in the left-right direction of the display device 14, and this left-right direction is the movement direction of the function icons F1 to F7. Among the plurality of function icons F1 to F7, one disposed at the position of the operation unit 20 is displayed on the display surface 202 of the operation unit 20. In the present embodiment, the movement direction (arrangement direction) of the function icons F1 to F7 is a straight line oriented in the left-right direction, but is not limited thereto, and may be configured to move in a vertical direction or in a curved manner.

When the user performs a slide operation on the function icons F1 to F7, the control unit 10 moves and displays the function icons F1 to F7 according to this slide operation. In this case, one of the function icons F1 to F7 moved to the position of the operation unit 20 by the slide operation is displayed on the display surface 202, and a function indicated by the function icon displayed on the display surface 202 is selected. In FIG. 18, the music icon F4 is displayed on the display surface 202, and a music function is selected. When one of these function icons F1 to F7 is moved to the right, the telephone icon F3 is displayed on the display surface 202, and a telephone function is selected. When each of the function icons F1 to F7 is selected in this way, a display mode of each of the function icons F1 to F7 is changed according to the selected function in step S58 in FIG. 16. In FIG. 18, the music function is selected, and the character 61 is changed to a state of wearing headphones to enjoy music. In (A) in FIG. 19, the telephone function is selected, and the character 61 is changed to a state of holding a telephone receiver to make a telephone call. When the touch operation is performed on the position PX of the display device 14 in this state, the changed character 61 is displayed at the position where the touch operation is performed, as illustrated in (B) in FIG. 19.

In the present embodiment, if the character 61 is not displayed or if the operation unit 20 is not provided, when the touch operation is performed on the display device 14, the control unit 10 may display the selection menu at the position of the touch operation.

The in-vehicle system 100B of the present embodiment further includes the touch panel (touch detection unit) 14B that detects the touch operation performed by the user on the display device 14, and moves the display content to the position on the display device 14 where the touch operation is performed. Accordingly, the in-vehicle system 100B can display the display content at the position selected by the user, and can improve convenience.

The in-vehicle system 100B of the present embodiment is the same as that of the second embodiment except for the configuration for moving the display content to the position where the touch operation is performed, and may be the same as that of the first embodiment.

Fourth Embodiment

The present embodiment is different from the third embodiment described above in that the present embodiment includes a plurality of sets (display units) of the display devices 14 and the display surfaces 202, and other configurations are the same as those of the first embodiment, and thus, the same elements will be given the same reference numerals and will not be described again.

Figure 20:
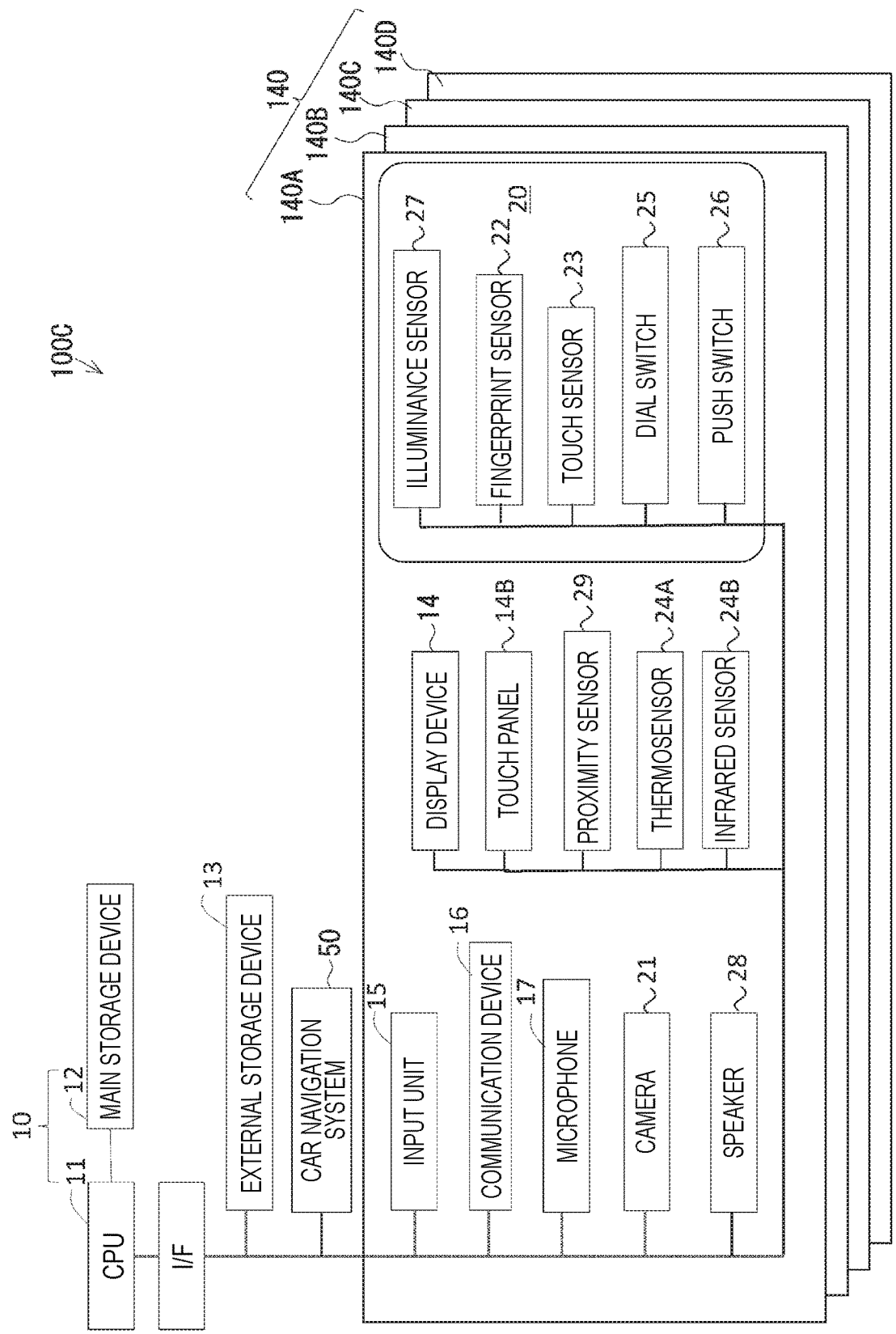
FIG. 20 is a diagram illustrating a hardware configuration of an in-vehicle system according to a fourth embodiment.
Figure 21:
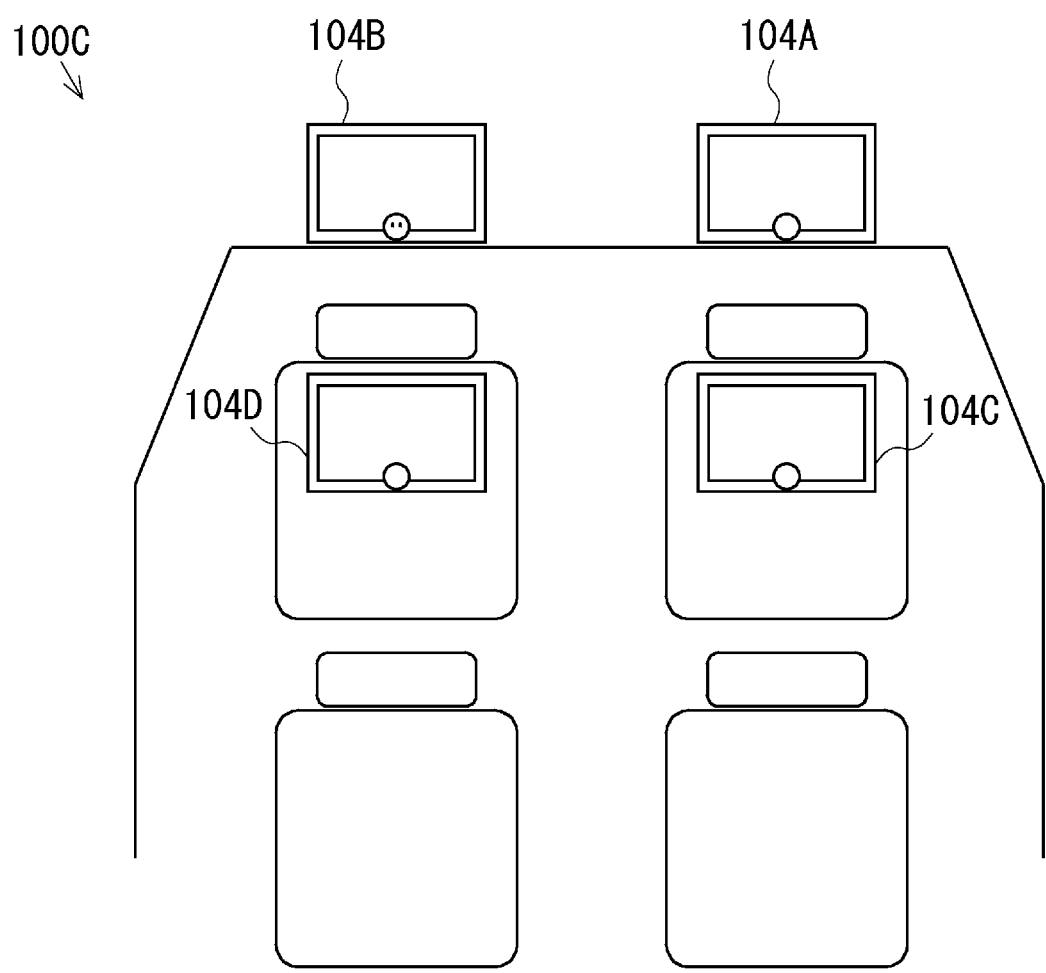
FIG. 21 is a diagram illustrating arrangement of display units in a vehicle.

FIG. 20 is a diagram illustrating a hardware configuration of an in-vehicle system 100C according to a fourth embodiment. The in-vehicle system 100C includes a plurality of display units 140. FIG. 21 is a diagram illustrating arrangement of the display units in the vehicle. The display unit 140 is a user interface that includes a set of the display device 14 and the display surface 202, and is provided at a position that can be operated by the user of each seat in the vehicle. For example, a display unit 140A provided in the front seat (driver seat) is embedded in the instrument panel 40 in front of the driver seat, a display unit 140B provided in the front seat (passenger seat) is embedded in the instrument panel 40 in front of the passenger seat. The display units 140A and 140B of the front seats may be embedded in pillars (A pillars) in front of the front seats. Further, a display unit 140C provided in the seat (rear seat) behind the driver seat is embedded in a rear surface of a headrest or a rear surface of a seatback of the driver seat, and a display unit 140D provided in the seat (rear seat) behind the passenger seat is embedded in a rear surface of a headrest or a rear surface of a seatback of the passenger seat. The displays of the rear seats may be embedded in pillars (B pillars in the center of the vehicle) in front of the seats or in a ceiling surface. In FIG. 21, the vehicle has a total of four seats, two seats on the front side and two seats on the rear side, but the present disclosure is not limited thereto, and may have a configuration without rear seats or a configuration with a plurality of rows of rear seats. The in-vehicle system 100C may include the display units 140 in all of these seats, or may include the display units 140 in only a part of seats. The vehicle is not limited to a passenger car, and may be a bus, a taxi, or the like.

The display units 140 of the present embodiment each include the camera 21, the proximity sensor (approach detection unit) 29, the microphone 17, and the speaker 28. Therefore, the operation by the user on the in-vehicle system 100C and the output from the in-vehicle system 100C to the user can be performed at each seat in the same manner as in the embodiments described above.

When the display unit 140 provided at each seat receives an operation performed by the user, for example, when obtaining a speech for performing an operation such as "Hey, ○○" through the microphone 17, or when obtaining a gesture of the user for performing an operation by the camera 21, if the operation on the operation unit 20 is detected, the in-vehicle system 100C feeds back to the user that the operation is detected. For example, the in-vehicle system 100C may perform feedback by outputting, from the speaker 28, a voice message such that "operation is detected" or "do you need something?", or by performing displays such as blinking the display surface 202, increasing the luminance of the display surface 202, and displaying a message on the display device 14.

In response to receiving the operation performed by the user, the in-vehicle system 100C of the present embodiment feeds back that the operation is received by moving the character 61 to the display device (third display) 14 of the display unit 140 that receives the operation. The in-vehicle system 100C of the present embodiment displays the character 61 only on one display surface 202 among the plurality of display units 140. If a movement flag is generated in a case where the operation of the user on the display unit 140 on which the character 61 is not displayed is detected or the like, the control unit 10 of the in-vehicle system 100C moves the character 61 from the display unit 140 where the character 61 is displayed to the display unit 140 where the movement flag is generated. The generation of the movement flag is not limited to the case where the operation of the user is detected, and may be generated in, for example, a case where the approach of the hand of the user to the operation unit 20 is detected, a case where the speech of the user is detected, or a case where the touch operation on the display device 14 is detected. That is, among the display units 140 of the seats, the display device 14 of the display unit 140 in which the movement flag is generated is set as a movement destination, and the character 61 is moved to the movement destination.

Figure 22:
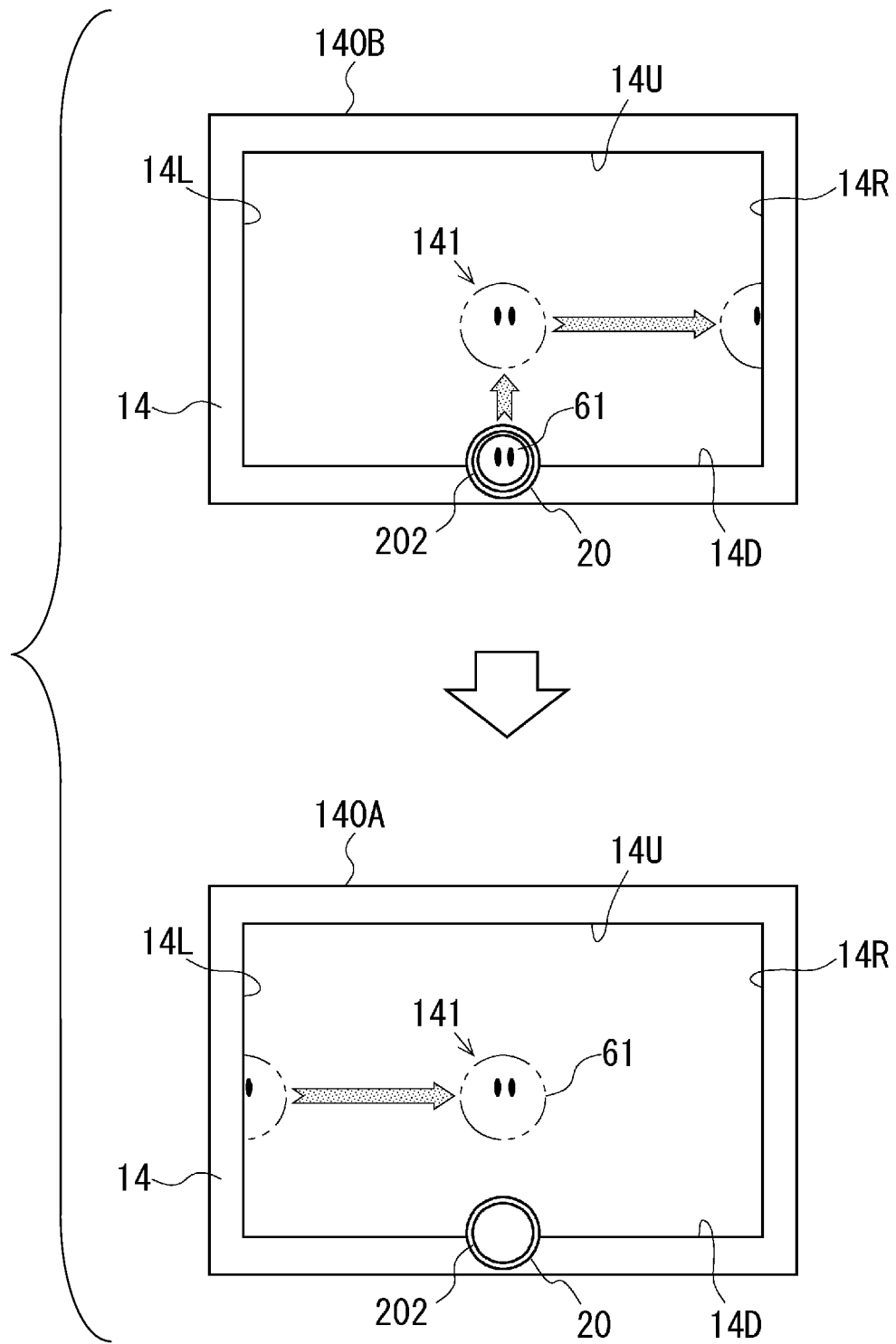
FIG. 22 is a diagram illustrating an example in which a character 61 moves between the display units disposed on seats arranged left and right.

FIG. 22 is a diagram illustrating an example in which the character 61 moves between the display units 140 disposed on the seats arranged left and right. For example, when the character 61 is displayed on the display surface 202 of the display unit 140B at the passenger seat, if the movement flag is generated on the display unit 140A of the seat (driver seat) arranged in a horizontal direction in the vehicle with respect to the passenger seat, the control unit 10 moves the character 61 from the display unit 140B set as a movement source to the display unit 140A set as the movement destination. In this case, the control unit 10 displays an operation (animation) on the display device 14 according to the arrangement of the display units 140A and 140B, so that it is possible to know to which display unit 140 the character 61 moves or from which display unit 140 the character 61 is moved.

In the case of FIG. 22, the control unit 10 displays, on the display device 14, an operation of moving the character 61 from the display surface 202 of the display unit 140B, which is the movement source, to a predetermined position (directly above the display surface 202) 141 of the display device 14, and then moving the character 61 in a direction corresponding to the position of the display unit 140A which is the movement destination. That is, the control unit 10 displays an operation (cutout) of moving the character 61 in a right direction from the predetermined position 141 of the display device 14 of the display unit 140B, and causing the character 61 to disappear (move outward) from a side (right side) 14R in the direction where the display device (third display) of the display unit 140A, which is the movement destination, is present. The control unit 10 displays the character (display content) 61 on the display device 14 of the movement destination in a manner of appearing from a side in the direction where the display device 14 of the movement source is present. For example, since the display unit 140B, which is the movement source, is located on a left side of the display unit 140A, the control unit 10 displays, on the display device 14 of the display unit 140A, an operation (cut-in) of appearing from a left side 14L of the display device 14 and moving in a direction (right direction) of the predetermined position 141. Accordingly, the in-vehicle system 100C can notify the user at the passenger seat that the character 61 is moved to the display unit 140A at the driver seat, and can also notify the user at the driver seat that the character 61 is moved from the passenger seat. The in-vehicle system 100C can feed back, to the user at the driver seat, a matter that the operation is detected by the movement of the character 61. When the character 61 is displayed on the display surface 202 of the display unit 140A at the driver seat, if the movement flag is generated on the display unit 140B at the passenger seat, the control unit 10 performs a display to move the character 61 in an opposite direction to that illustrated in FIG. 22. When the character 61 is displayed on the display surface 202 of the display unit 140D at the left rear seat, even if the movement flag is generated in the display unit 140C at the right rear seat, the control unit 10 may move the character 61 from the display unit 140D set as the movement source to the display unit 140C set as the movement destination, and display the character 61, similarly to FIG. 22.

Figure 23:
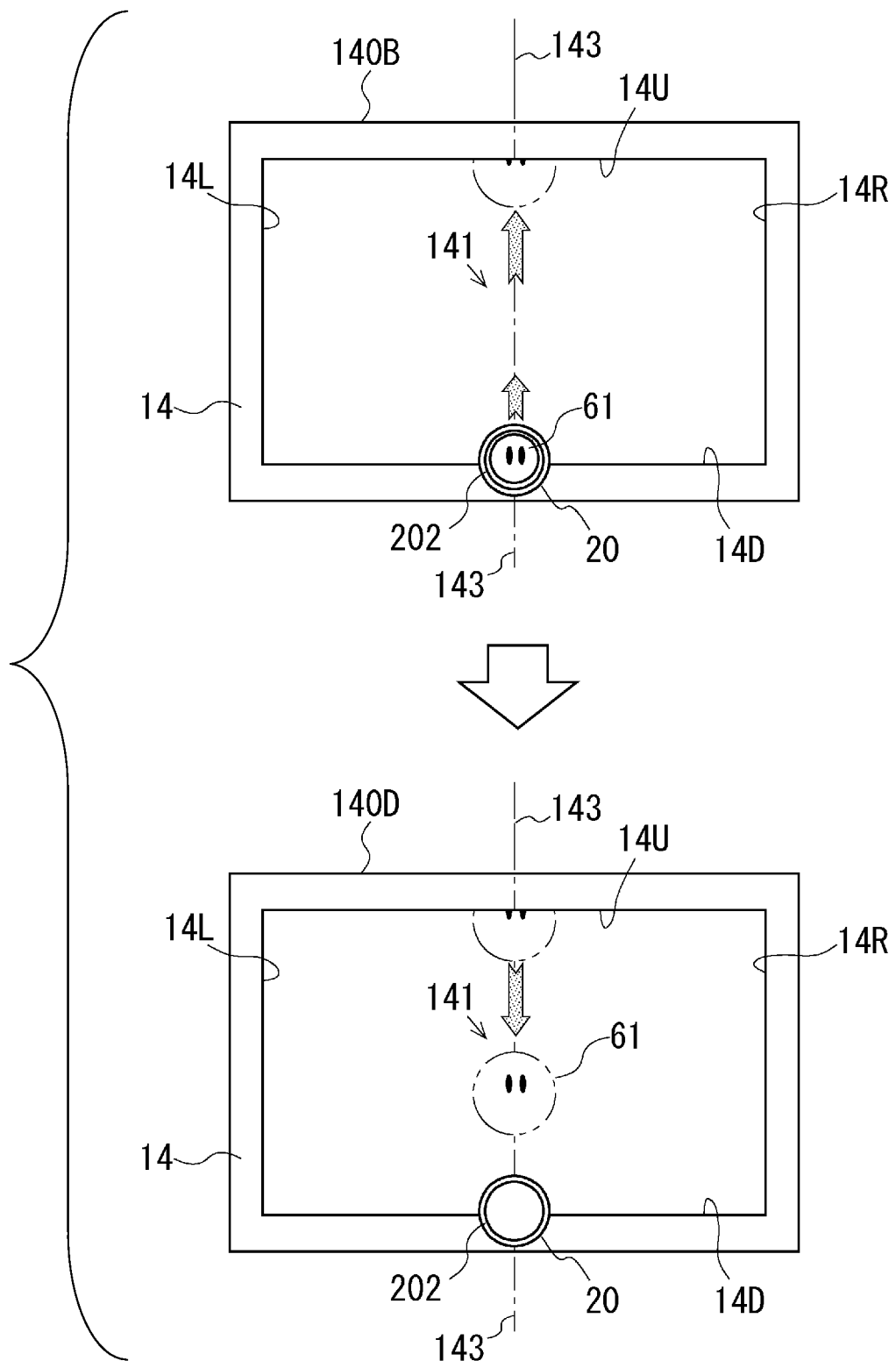
FIG. 23 is a diagram illustrating an example in which the character 61 moves between the display units disposed on seats arranged in front and back.

FIG. 23 is a diagram illustrating an example in which the character 61 moves between the display units 140 disposed on the seats arranged in front and back. For example, when the character 61 is displayed on the display surface 202 of the display unit 140B at the passenger seat, if the movement flag is generated on the display unit 140D of the seat (left rear seat) arranged in a front-rear direction in the vehicle with respect to the passenger seat, the control unit 10 moves the character 61 from the display unit 140B set as the movement source to the display unit 140D set as the movement destination.

In the case of FIG. 23, the control unit 10 displays, on the display device 14 of the movement source, an operation of moving the character 61 from the display surface 202 of the display unit 140B, which is the movement source, to the predetermined position (directly above the display surface 202) 141 of the display device 14, and then moving the character 61 toward a side in the direction where the display device (third display) 14 of the display unit 140A, which is the movement destination, is present, and causing the character 61 to disappear. For example, the control unit 10 displays an operation (cutout) of moving the character 61 in an up direction from the predetermined position 141 of the display device 14 of the display unit 140B, moving the character 61 toward a side (up side) 14U corresponding to a position of the main display unit 140D, and causing the character 61 to disappear. The control unit 10 displays the character (display content) 61 on the display device 14 (third display) of the movement destination in a manner of appearing from the side in the direction where the display device 14 of the movement source is present. For example, since the display unit 140B, which is the movement source, is located on a front side of the display unit 140D, the control unit 10 displays, on the display device 14 of the display unit 140D, an operation (cut-in) of appearing from the up side 14U of the display device 14 and moving in a direction (down direction) of the predetermined position 141. Accordingly, the in-vehicle system 100C can notify the user at the passenger seat that the character 61 is moved to the display unit 140A at the left rear seat, and can also notify the user at the left rear seat that the character 61 is moved from the passenger seat. When the character 61 is displayed on the display surface 202 of the display unit 140D at the left rear seat, if the movement flag is generated on the display unit 140B at the passenger seat, the control unit 10 may move and display the character 61 similarly to FIG. 23. When the character 61 is displayed on the display surface 202 of the display unit 140A at the driver seat, if the movement flag is generated in the display unit 140C at the right rear seat, or when the character 61 is displayed on the display surface 202 of the display unit 140C at the right rear seat, if the movement flag is generated in the display unit 140A at the driver seat, the control unit 10 may move and display the character 61 similarly to FIG. 23.

In FIG. 23, when a central axis in the up-down direction is set as an up-down axis 143 on the display surface of the display device 14, the control unit 10 moves the character 61 directly upward from the predetermined position 141 along the up-down axis 143 when moving the character 61 from the display unit 140B to the display unit 140D, for example. On the other hand, for example, when moving the character 61 from the display unit 140B to the display unit 140C, the control unit 10 may tilt the movement direction of the character 61 diagonally upward to the right from the up-down axis 143 according to the position of the display unit 140C. When moving the character 61 from the display unit 140C to the display unit 140B, the control unit 10 may move the character 61 from a right side of the up side 14U diagonally to the lower left direction according to the position of the display unit 140C, and display the character 61 until moving to the predetermined position 141.

In the example of FIG. 23, the control unit 10 may perform a display in manner of moving the character 61 to be cut out so as to exit from the up side 14U, and making a U-turn and moving the character 61 in the down direction to exit from a down side 14D after moving the character 61 in the up direction from the predetermined position 141. The control unit 10 may move the cut-in character 61 in the up direction from the down side 14D, and then make a U-turn, and move the character 61 in the down direction to the predetermined position 141 to display the character 61.

Figure 24:
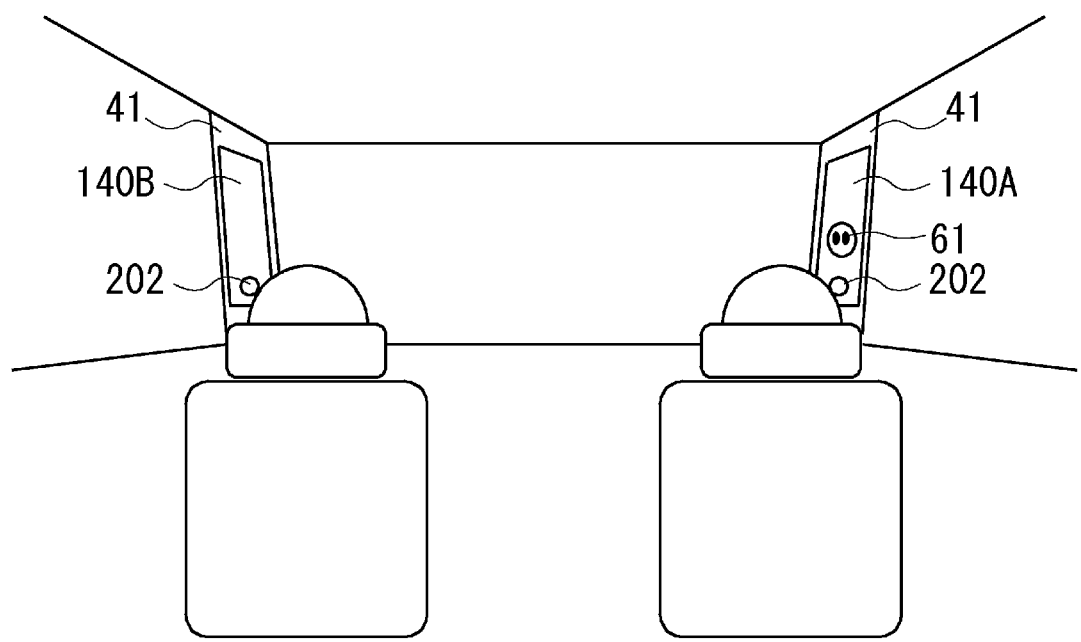
FIG. 24 is a diagram illustrating an example in which the display unit on a driver seat side and the display unit on a passenger seat side are disposed on pillars.

FIG. 24 is a diagram illustrating an example in which the display unit 140A on a driver seat side and the display unit 140B on a passenger seat side are disposed on pillars 41. When the display units 140A and 140B are disposed on the pillars as illustrated in FIG. 24, similarly to the case of being disposed on the instrument panel 40 as described above, it is possible to accept an operation performed by the user (driver) at the driver seat and provide feedback to the user, and to accept an operation performed by the user at the passenger seat and provide feedback to the user. In addition to the display units 140A and 140B disposed on the instrument panel 40, an additional display device may be disposed on the pillar as in FIG. 24, and feedback that the operation is detected may be displayed on the display device at the pillar. In this case, the control unit 10 may move the character 61 to the display device 14 of the movement destination, and then further move the character 61 to the display device at the pillar to display the character 61.

Figure 25:
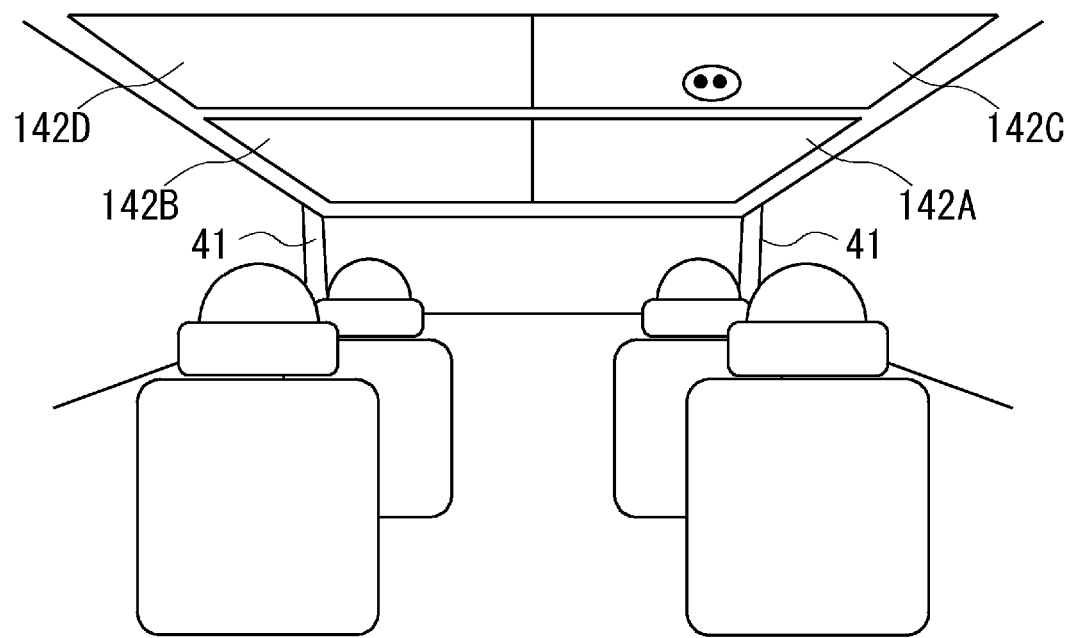
FIG. 25 is a diagram illustrating an example in which a display device is provided on a ceiling surface.

Further, FIG. 25 is a diagram illustrating an example in which display devices 142A to 142D are provided on the ceiling surface. The display devices 142A to 142D are additional display devices provided on the ceiling surface of the seats and separately from the display units 140A to 140D of the seats. The display devices 142A to 142D may be projection devices that project display images. If an operation performed by a user at each of the seats are detected, the control unit 10 causes the display devices 142A to 142D of the seats to perform a display indicating that the operation is detected, and provides feedback to the user at the seat that the operation is detected.

Figure 26:
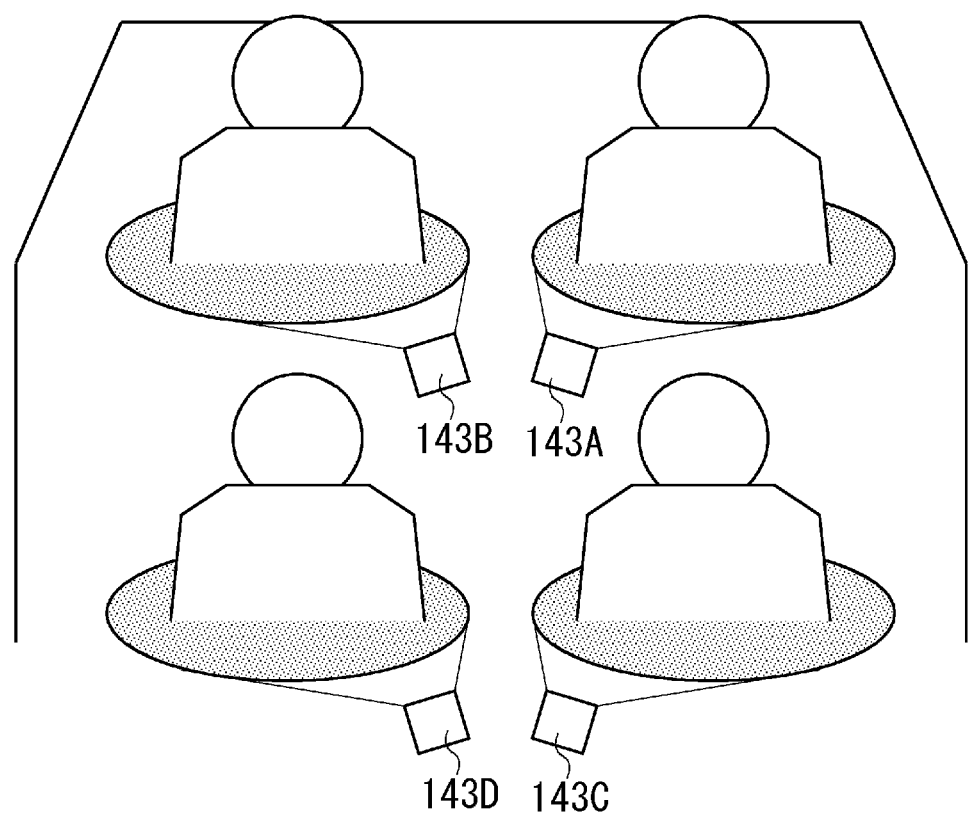
FIG. 26 is a diagram illustrating an example including projection devices that project images onto a floor surface.

FIG. 26 is a diagram illustrating an example including projection devices 143A to 143D that project images onto a floor surface. The projection devices 143A to 143D are examples of the additional display device provided on the ceiling surface of the seats and separately from the display units 140A to 140D of the seats. The projection devices 143A to 143D may be projection devices that project display images. If an operation performed by a user at each of the seats are detected, the control unit 10 causes the projection devices 143A to 143D of the seats to perform a display indicating that the operation is detected, and provides feedback to the user at the seat that the operation is detected.

The in-vehicle system 100C of the present embodiment is the same as the third embodiment except for the configuration including the plurality of display units 140, and may be the same as the first embodiment or the second embodiment. Although the movement of the character 61 is mainly described in the present embodiment, the display content to be moved is not limited to the character 61, but may be any display content related to the operation of the operation unit 20, such as the set temperature of the air conditioner or the icon of the selected function.

As described above, the in-vehicle system 100C of the present embodiment can improve the visibility of the display content by moving the display content of the operation unit 20 to the display device and displaying the display content on the display device. The in-vehicle system 100C of the present embodiment feeds back to the user that the operation performed by the user is detected, so that it is possible to prevent discrepancies between the operation of the in-vehicle system 100C that receives the operation and the recognition of the user who performs the operation.

Further, the in-vehicle system 100C of the present embodiment moves the character 61 displayed on any one of the plurality of display units 140 to the display unit 140 where the movement flag is generated, and displays the character 61 on the display unit 140, so that it is possible to provide a user-friendly system in which the character 61 present at somewhere among the plurality of display units 140 is called up by the user and moves within the system.

In the present embodiment, the character 61 is displayed on any one of the plurality of display units 140, but the character 61 may be displayed on some or all of the plurality of display units 140. For example, the character 61 may be displayed on one of the display units 140A and 140B at the front seats and one of the display units 140C and 140D at the rear seats.

As illustrated in FIG. 11, when the support mechanism 30A supports the operation unit 20 so as to be movable forward and backward, in the display unit 140 where the character is displayed, the operation unit 20 may be in the first state, and in the display unit 140 where the character is displayed, the operation unit 20 may be in the second state.

Others

In the embodiments described above, the in-vehicle system 100 is used as an example of a computer system that executes processing of moving the display content on the display surface 202 of the operation unit 20. However, the configurations of the above embodiments are not limited to an in-vehicle system. That is, the configurations of the above embodiments can be applied to various systems that function as interactive systems, such as general personal computers, multimedia terminals at convenience stores, and game machines.

Computer-Readable Recording Medium

A program that causes a computer or another machine or device (hereinafter, referred to as a computer or the like) to implement any one of the above functions can be recorded on a computer-readable recording medium. The function can be provided by causing a computer or the like to read and execute the program on the recording medium.

Here, the computer-readable recording medium refers to a recording medium that stores information such as data and programs by an electrical, magnetic, optical, mechanical, or chemical action and can be read by a computer or the like. Among such recording media, a medium that is removable from a computer or the like includes, for example, a memory card such as a flexible disc, a magneto-optical disc, a CD-ROM, a CD-R/W, a DVD, a Blu-ray disc, DAT, an 8 mm tape, and a flash memory. In addition, there is a hard disc, a read only memory (ROM), or the like as a recording medium fixed in a computer or the like. Furthermore, a solid state drive (SSD) can be used as a recording medium that is removable from a computer or the like, or as a recording medium that is fixed to a computer or the like.

The invention claimed is:

1. An information processing device, comprising:
   a first display;
   an operation unit arranged in parallel with the first display;
   a second display provided on at least one surface of the operation unit; and
   a controller configured to move a display content displayed on the second display from the second display to the first display and display the display content on the first display, wherein
   the display content is a character imitating a face.

2. The information processing device according to claim 1, wherein
   in response to detecting a speech of a user for the character, the controller moves the character from the second display to the first display.

3. The information processing device according to claim 1, wherein
   when a predetermined function is selected while the character is displayed on the first display, the controller displays an icon related to the selected function on the second display.

4. The information processing device according to claim 3, wherein
   the controller is configured to change a display mode of the character displayed on the first display depending on the selected function.

5. The information processing device according to claim 3, wherein
   the controller is configured to:
   line up a plurality of icons displayed on the first display and at least one icon displayed on the second display in a row in a predetermined movement direction, and move the plurality of icons in the movement direction according to a slide operation performed by a user on the icon,
   select a function indicated by the icon displayed on the second display after the movement, and
   change a display mode of the character moved to the first display depending on the selected function.

6. The information processing device according to claim 1, further comprising:
   a third display, wherein
   the controller moves the display content from the second display to the first display, and moves the display content from the first display to the third display.

7. The information processing device according to claim 6, wherein
   the first display and the third display are provided to respectively correspond to seats arranged in a horizontal direction of a vehicle, and
   when moving the display content, after the display content on the first display moves toward a side in a direction where the third display is present, and disappears, the controller displays the display content on the third display such that the display content appears from a side in a direction where the first display is present.

8. The information processing device according to claim 7, wherein
   in response to detecting an operation performed by a user on the third display, the controller moves the display content from the first display to the third display.

9. The information processing device according to claim 6, wherein
   the first display and the third display are provided to respectively correspond to seats arranged in a front-rear direction of a vehicle, and
   when moving the display content from the first display to the third display, after the display content on the first display moves toward a side in an up direction and disappears, the controller displays the display content on the third display such that the display content appears from the side in the up direction.

10. The information processing device according to claim 1, wherein
    the controller uses detection of any one of an operation performed by a user on the operation unit, approach of a hand of the user to the operation unit, a speech of the user, and a touch operation performed by the user on the first display as a trigger to move the display content displayed on the second display from the second display to the first display and display the display content on the first display.

11. An information processing device, comprising:
    a controller configured to control a first display and a second display that is provided on at least one surface of an operation unit arranged in parallel with the first display, wherein
    the controller is configured to move a display content displayed on the second display from the second display to the first display and display the display content on the first display, and the display content is a character imitating a face.

12. An information processing method performed by a controller, wherein
    the controller is configured to control a first display and a second display provided on at least one surface of an operation unit arranged in parallel with the first display, and
    the information processing method comprises:

moving a display content displayed on the second display from the second display to the first display and display the display content on the first display, wherein the display content is a character imitating a face.

13. An information processing device, comprising:
a first display;
an operation unit arranged in parallel with the first display;
a second display provided on at least one surface of the operation unit; and
a controller configured to move a display content displayed on the second display from the second display to the first display and display the display content on the first display in a format that has an increased size over a size of the display content when on the second display.

* * * * *